United States Patent
Sakagami et al.

(10) Patent No.: US 9,057,424 B2
(45) Date of Patent: Jun. 16, 2015

(54) TRACTION TRANSMISSION CAPACITY CONTROL DEVICE USED IN DRIVE FORCE DISTRIBUTION DEVICE

(75) Inventors: Eigo Sakagami, Kawasaki (JP); Hideo Iwamoto, Atsugi (JP); Hiroyuki Ashizawa, Yokohama (JP); Kenichi Mori, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 408 days.

(21) Appl. No.: 13/379,973

(22) PCT Filed: May 10, 2010

(86) PCT No.: PCT/JP2010/057883
§ 371 (c)(1),
(2), (4) Date: Dec. 21, 2011

(87) PCT Pub. No.: WO2011/001743
PCT Pub. Date: Jan. 6, 2011

(65) Prior Publication Data
US 2012/0100955 A1    Apr. 26, 2012

(30) Foreign Application Priority Data

Jun. 30, 2009   (JP) .................................. 2009-154483

(51) Int. Cl.
*B60K 17/34* (2006.01)
*F16H 13/02* (2006.01)
(Continued)

(52) U.S. Cl.
CPC ................ *F16H 13/02* (2013.01); *B60K 17/34* (2013.01); *B60K 17/35* (2013.01); *B60K 23/0808* (2013.01)

(58) Field of Classification Search
CPC .. B60K 17/35; B60K 23/0808; B60K 17/348; B60K 23/08; B60K 17/34; F16H 13/03; F16H 13/04; F16H 13/14; F16H 13/10; F16H 13/06; F16H 13/00; F16H 15/00; F16H 15/48

USPC ............. 74/665 L, 665 N; 475/169, 170, 183, 475/185, 195; 476/61, 4, 11, 30, 47, 48; 701/69; 180/233, 248

See application file for complete search history.

(56) References Cited

U.S. PATENT DOCUMENTS 4,559,846 A * 12/1985 Cochran et al. .......... 74/665 GA
4,782,721 A * 11/1988 Dick ......................... 74/665 GA
(Continued)

FOREIGN PATENT DOCUMENTS

DE    100 27 721 A1    12/2001
JP    11-159545 A      6/1999
(Continued)

OTHER PUBLICATIONS

U.S. Appl. No. 13/375,634, filed Dec. 1, 2011, Eigo Sakagami et al.

*Primary Examiner* — William Kelleher
*Assistant Examiner* — Gregory Prather
(74) *Attorney, Agent, or Firm* — Foley & Lardner LLP

(57) ABSTRACT

A traction transmission capacity control device includes a one-direction turning-stop-position detecting means configured to detect a position at which the turning of a second roller stops after a second-roller turning means starts to turn the second roller in one direction; an another-direction turning-stop-position detecting means configured to detect a position at which the turning of the second roller stops after the second-roller turning means starts to turn the second roller in another direction; and a second-roller turning-motion reference-point setting means configured to set a center position between the position detected by the one-direction turning-stop-position detecting means and the position detected by the another-direction turning-stop-position detecting means, as a turning-motion reference point of the second roller. The traction transmission capacity control device is configured to perform a traction transmission capacity control based on a second-roller turning amount given from the turning-motion reference point of the second roller.

3 Claims, 11 Drawing Sheets

(51) Int. Cl.
 B60K 17/35 (2006.01)
 B60K 23/08 (2006.01)

(56) References Cited

U.S. PATENT DOCUMENTS

| | | | |
|---|---|---|---|
| 4,901,598 A * | 2/1990 | Batchelor et al. | 74/665 GA |
| 5,054,335 A * | 10/1991 | Andrews | 74/665 GA |
| 5,478,292 A * | 12/1995 | Sato et al. | 475/293 |
| 5,819,194 A * | 10/1998 | Hara et al. | 701/89 |
| 6,123,183 A | 9/2000 | Ito et al. | |
| 6,238,317 B1 * | 5/2001 | Brown et al. | 475/206 |
| 6,438,480 B2 * | 8/2002 | Tanaka et al. | 701/69 |
| 6,440,030 B1 * | 8/2002 | Minegishi et al. | 475/178 |
| 6,551,211 B2 | 4/2003 | Kanazawa | |
| 6,623,395 B2 * | 9/2003 | Lovatt | 475/204 |
| 6,849,025 B2 * | 2/2005 | Chikaraishi et al. | 476/21 |
| 7,124,045 B2 | 10/2006 | Yamamoto et al. | |
| 7,575,535 B2 * | 8/2009 | Yamamoto | 476/42 |
| 7,654,375 B2 * | 2/2010 | Okada et al. | 192/35 |
| 8,187,134 B2 * | 5/2012 | Mori et al. | 475/165 |
| 8,402,851 B2 * | 3/2013 | Mori et al. | 74/67 |
| 8,579,757 B2 * | 11/2013 | Sakagami et al. | 476/67 |
| 2002/0147068 A1 | 10/2002 | Chikaraishi et al. | |
| 2004/0111206 A1 * | 6/2004 | Nagano | 701/69 |
| 2004/0198549 A1 * | 10/2004 | Wafzig | 476/39 |
| 2005/0143211 A1 * | 6/2005 | Yamamoto | 475/183 |
| 2009/0170656 A1 * | 7/2009 | Yamamoto | 476/9 |
| 2009/0305839 A1 * | 12/2009 | Nett et al. | 475/295 |
| 2010/0094519 A1 * | 4/2010 | Quehenberger et al. | 701/69 |
| 2012/0089310 A1 * | 4/2012 | Sakagami et al. | 701/69 |
| 2014/0021284 A1 * | 1/2014 | Tracey et al. | 242/390.9 |

FOREIGN PATENT DOCUMENTS

| | | |
|---|---|---|
| JP | 2002-87091 A | 3/2002 |
| JP | 2002-349653 A | 12/2002 |
| JP | 2005-326302 A | 11/2005 |
| JP | 2006-132738 A | 5/2006 |

* cited by examiner

TRACTION TRANSMISSION CAPACITY CONTROL DEVICE USED IN DRIVE FORCE DISTRIBUTION DEVICE

TECHNICAL FIELD

The present invention relates to a transmission-capacity control device for a traction-transmission-type drive force distribution device which is useful as a transfer means of a four-wheel-drive vehicle. Particularly, the present invention relates to a traction transmission-capacity control device for a drive force distribution device, devised to accurately calculate a reference point of a traction transmission-capacity control motion always irrespective of the manufacturing variability and errors in dimension or the like.

BACKGROUND ART

Various drive force distribution devices have been proposed. It is conceivable that a structure in which a first roller that rotates together with a rotating member constituting a torque-transfer path toward main drive (road-)wheels and a second roller that rotates together with a rotating member constituting a torque-transfer path toward auxiliary drive wheels are in contact with each other to be pressed radially to each other is employed by using a traction transmission method as disclosed in Patent Literature 1.

In this traction-transmission-type drive force distribution device, a torque obtainable for the main drive wheels can be partly distributed and outputted to the auxiliary drive wheels by a traction transmission generated at a radially-pressing contact portion between the first roller and the second roller. Thereby, drive force can be distributed and outputted to the main drive wheels and the auxiliary drive wheels.

The above drive force distribution device needs a traction transmission-capacity control for controlling a traction transmission capacity of the drive force distribution device, i.e., for controlling a traction transmission capacity at the radially-pressing mutual-contact portion between the first roller and the second roller, to bring the traction transmission capacity to a torque capacity according to a required distribution drive force for the auxiliary drive wheels.

In the traction transmission-capacity control proposed by the Patent Literature 1, it is stated that a mutual radially-pressing force between the rollers automatically attains a traction transmission-capacity value according to a transfer torque.

CITATION LIST

Patent Literature

Patent Literature 1: Japanese Patent Application Publication No. 2002-349653

SUMMARY OF THE INVENTION

In a most common case of a traction transmission-capacity control device that is used for the above-mentioned drive force distribution device; the second roller is supported rotatably on an eccentric shaft portion of a crankshaft, and the radially mutual pressing force between the first roller and the second roller is varied by a rotational operation of the crankshaft so that the traction transmission capacity is controlled.

In this case, since the second roller is turned around a rotational axis of the crankshaft by the rotational operation of the crankshaft, the traction transmission-capacity control is performed between a traction non-transmission state where the first roller and the second roller are away from each other so that traction is not transmitted and a traction transmission-capacity-maximum state where the first roller and the second roller are closest to each other so that an overlap amount between the first and second rollers is maximized.

Therefore, a relation between a control-output motion amount (crankshaft rotation angle) of an actuator for rotating the crankshaft and a control-output torque of the actuator needs to be known for the traction transmission-capacity control. The control-output motion amount of the actuator is given from a reference point which is a certain motion position of the actuator. If this reference point is not clear, the relation between the control-output motion amount and the control-output torque of the actuator cannot be accurately grasped.

Even if the above reference point of the actuator is defined clearly, this reference point varies due to manufacturing variability and errors in dimension or the like of the drive force distribution device. Also, the relation between the control-output motion amount and the control-output torque of the actuator varies due to the manufacturing variability and errors in dimension or the like of the drive force distribution device.

However, in conventional techniques of the traction transmission-capacity control as disclosed in the Patent Literature 1, the reference point of the actuator is not clearly defined. Even assuming that the reference point of the actuator is clearly defined, this defined reference point of the actuator and the relation between the control-output motion amount and the control-output torque of the actuator are varied due to the manufacturing variability and errors in dimension or the like of the drive force distribution device. Hence, actually, it is difficult to expect a traction transmission-capacity control satisfying its targets.

It is an object of the present invention to provide a traction transmission-capacity control device for a drive force distribution device, devised to obtain a reference point of an actuator (a reference point of motion of a traction transmission-capacity control) always with precision irrespective of the manufacturing variability and errors in dimension or the like of the drive force distribution device so that the traction transmission-capacity control is performed constantly to satisfy its targets.

To achieve this object, a traction transmission capacity control device for a drive force distribution device according to the present invention is constructed as follows. At first, the drive force distribution device will now be explained. The drive force distribution device is configured to distribute drive force between main and auxiliary drive wheels by a traction transmission obtainable by a radially-pressing mutual contact between a first roller and a second roller. The first roller is configured to rotate together with a rotating member constituting a torque-transfer path toward the main drive wheel, and the second roller is configured to rotate together with a rotating member constituting a torque-transfer path toward the auxiliary drive wheel.

Next, the traction transmission-capacity control device according to the present invention includes a second-roller turning means configured to turn the second roller around an eccentric axis deviated from a rotation axis of the second roller, and configured to control a mutual radially-pressing force between the first roller and the second roller so that a traction transmission capacity is controlled.

Moreover, according to the present invention, the traction transmission-capacity control device includes a one-direction turning-stop-position detecting means, an another-direction turning-stop-position detecting means and a second-roller turning-motion reference-point setting means. The one-direction turning-stop-position detecting means is configured to detect a position at which the turning of the second roller stops after the second-roller turning means starts to turn the second roller in one direction. The another-direction turning-stop-position detecting means is configured to detect a position at which the turning of the second roller stops after the second-roller turning means starts to turn the second roller in another direction.

The second-roller turning-motion reference-point setting means is configured to set a center position between the one-direction turning-stop position detected by the one-direction turning-stop-position detecting means and the another-direction turning-stop position detected by the another-direction turning-stop-position detecting means, as a turning-motion reference point of the second roller. The traction transmission capacity control device according to the present invention is configured to perform a traction transmission capacity control based on a second-roller turning amount given from the turning-motion reference point of the second roller set by the second-roller turning-motion reference-point setting means.

BRIEF EXPLANATION OF DRAWINGS

FIG. 3 (a) is a front view of the bearing support. FIG. 3 (b) is a side view of the bearing support in longitudinal section.

FIG. 5 (a) is an explanatory view showing a spaced (separated) state between a first roller and a second roller, in which a crankshaft rotation angle is equal to 0° that is a reference point. FIG. 5 (b) is an explanatory view showing a contact state between the first roller and the second roller, in which the crankshaft rotation angle is equal to 90°. FIG. 5 (c) is an explanatory view showing a contact state between the first roller and the second roller, in which the crankshaft rotation angle is equal to 180°.

DETAILED DESCRIPTION OF INVENTION

Figure 1:
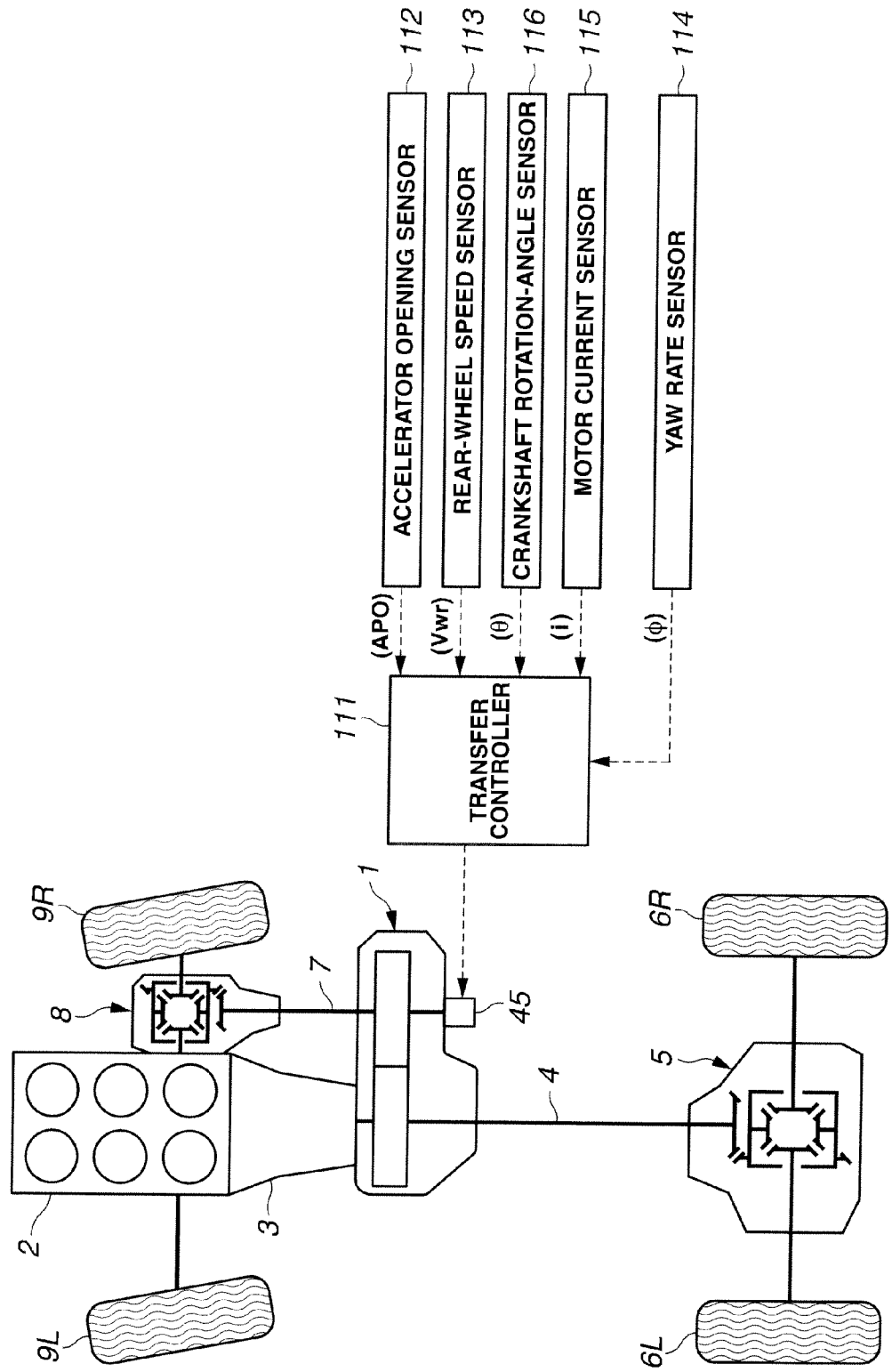
FIG. 1 A schematic plan view showing a power train of a four-wheel-drive vehicle equipped with a drive-force distribution device including a traction transmission-capacity control device in an embodiment according to the present invention, as viewed from an upper side of the vehicle.

Hereinafter, embodiments according to the present invention will be explained in detail referring to the drawings.
<Configuration>

FIG. 1 is a schematic plan view showing a power train of a four-wheel-drive vehicle equipped with a drive-force distribution device 1 as a transfer means, as viewed from an upper side of the vehicle. A traction transmission-capacity control device in one embodiment according to the present invention is provided in the drive-force distribution device 1.

The four-wheel-drive vehicle shown in FIG. 1 is constructed based on a rear-wheel-drive vehicle in which a rotation derived from an engine 2 is changed in speed by a transmission 3 and then is transmitted through a rear propeller shaft 4 and a rear final drive unit 5 to left and right rear road-wheels 6L and 6R. Moreover, the four-wheel-drive vehicle shown in FIG. 1 can attain a four-wheel-drive running when a part of a torque obtainable for the left and right rear road-wheels (main drive wheels) 6L and 6R is transmitted through a front propeller shaft 7 and a front final drive unit 8 to left and right front road-wheels (auxiliary drive wheels) 9L and 9R by the drive-force distribution device 1.

The drive-force distribution device 1 distributes the torque produced for the left and right rear road-wheels (main drive wheels) 6L and 6R, to the left and right rear road-wheels 6L and 6R and the left and right front road-wheels (auxiliary drive wheels) 9L and 9R as mentioned above. This distribution part of the torque is outputted to the left and right front road-wheels (auxiliary drive wheels) 9L and 9R. That is, a drive-force distribution ratio is determined between the left and right rear wheels (main drive wheels) 6L and 6R and the left and right front wheels (auxiliary drive wheels) 9L and 9R. In this embodiment, the drive-force distribution device 1 is constructed as shown in FIG. 2.

Figure 2:
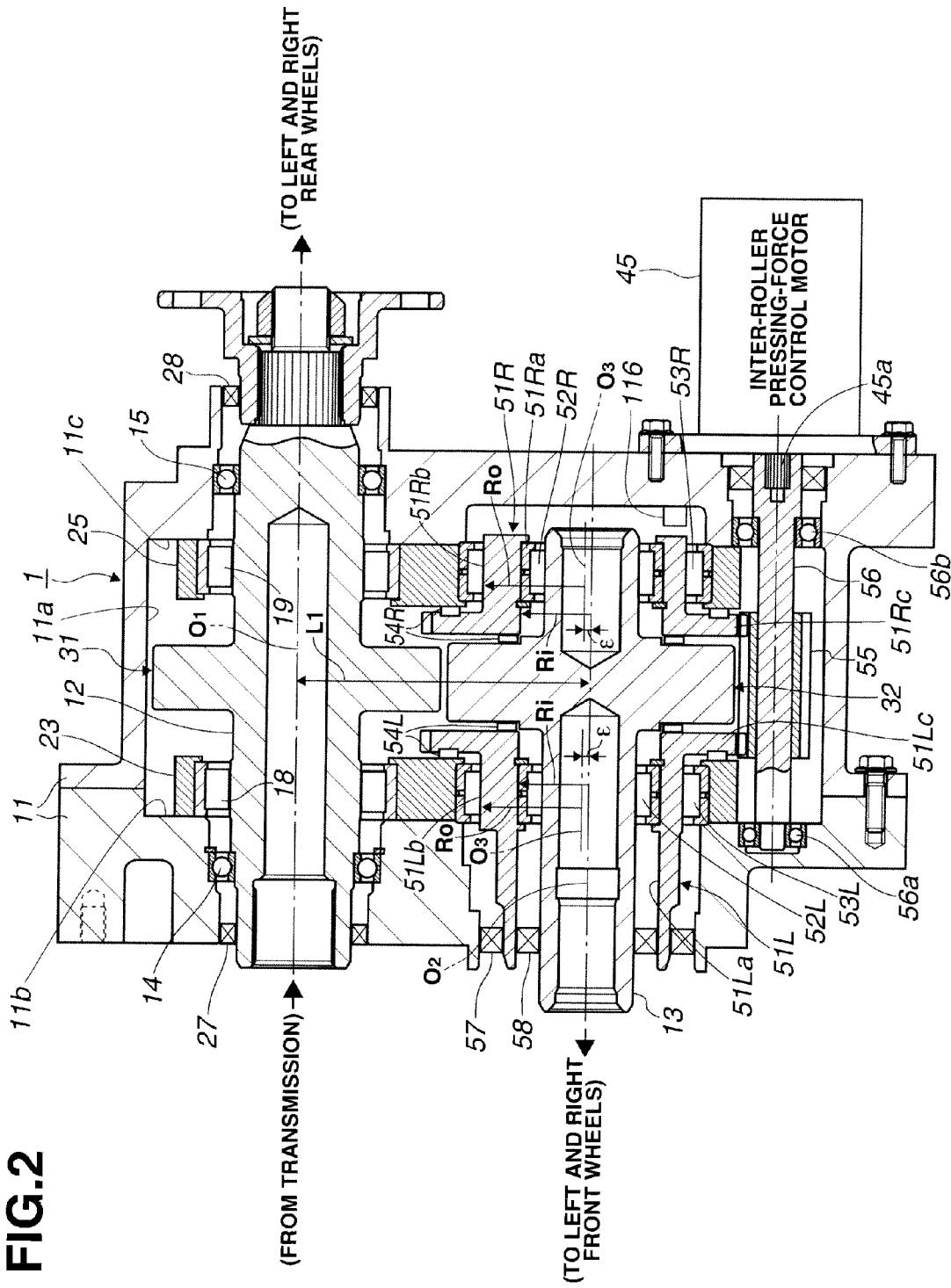
FIG. 2 A side view of the drive-force distribution device of FIG. 1 in longitudinal section.

In FIG. 2, "11" denotes a housing. An input shaft 12 and an output shaft 13 are provided parallel to each other and are laid horizontally across the housing 11. Both ends of the input shaft 12 are supported by ball bearings 14 and 15 to allow the input shaft 12 to rotate about an axis $O_1$ of the input shaft 12 relative to the housing 11.

Figure 3:
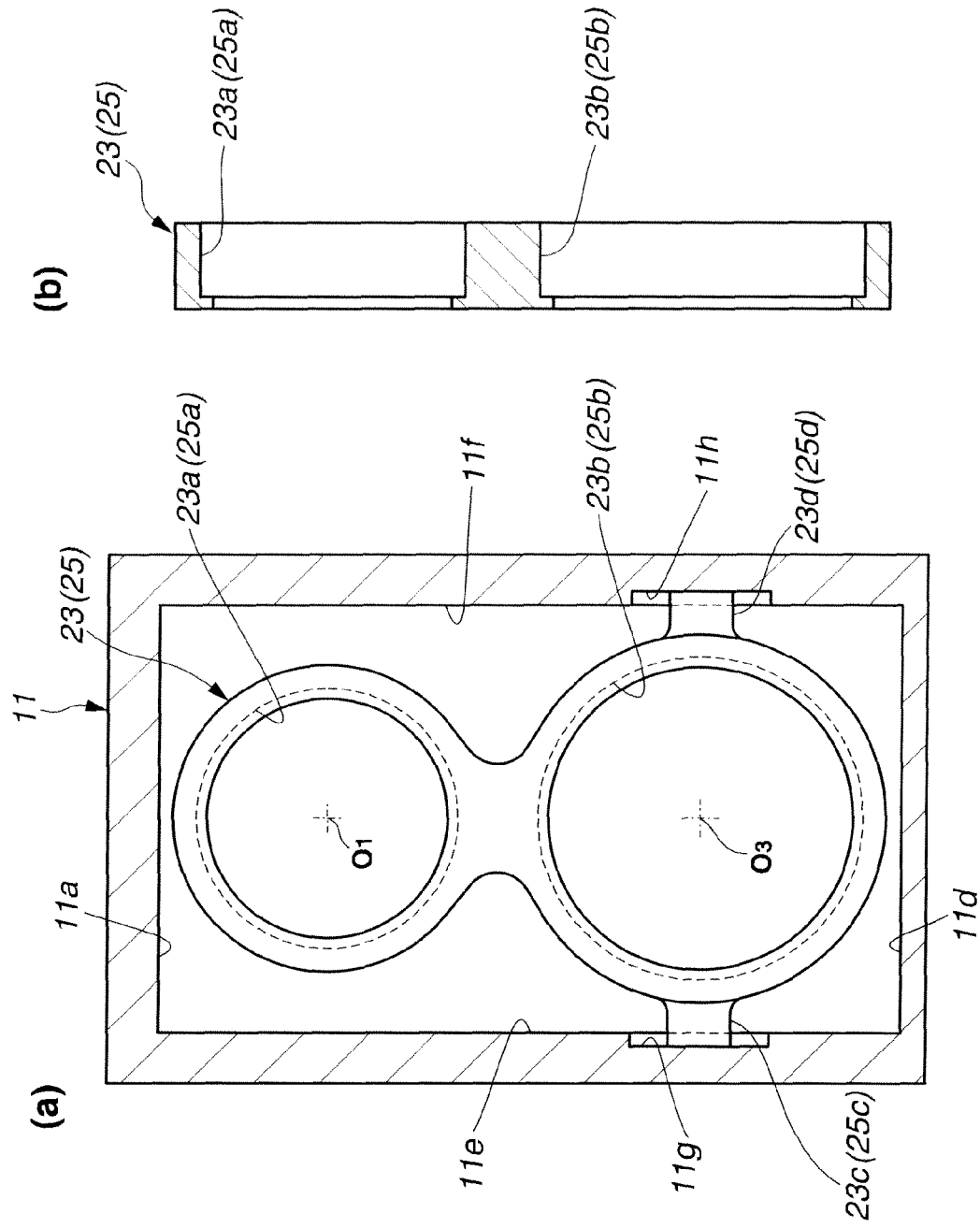
FIG. 3 Views showing a bearing support used in the drive-force distribution device of FIG. 2.

The input shaft 12 is further supported by roller bearings 18 and 19 to allow the input shaft 12 to rotate relative to bearing supports 23 and 25. Hence, each of the bearing supports 23 and 25 is formed with an opening 23a, 25a into which the roller bearing 18, 19 is fitted, as shown in FIG. 3 (a) and FIG. 3 (b). Each of the bearing supports 23 and 25 is a common rotatably-support plate for the input shaft 12 and the output shaft 13. As shown in FIG. 2, each of the bearing supports 23 and 25 is provided inside the housing 11 to be in contact with a corresponding inner wall 11b, 11c of the housing 11. However, each of the bearing supports 23 and 25 is not fixed to this inner wall 11b, 11c.

As shown in FIG. 2, the both ends of the input shaft 12 protrude from the housing 11 under a fluid-tight sealing by the seal rings 27 and 28. A left end (as viewed in FIG. 2) of the input shaft 12 is connected with an output shaft of the transmission 3 (see FIG. 1). A right end (as viewed in FIG. 2) of the input shaft 12 is connected through the rear propeller shaft 4 (see FIG. 1) with the rear final drive unit 5.

A first roller 31 is formed integrally with the input shaft 12 to be coaxial to the input shaft 12. The first roller 31 is located at the middle of the input shaft 12 in an axial direction of the input shaft 12. A second roller 32 is formed integrally with the output shaft 13 to be coaxial to the output shaft 13. The second roller 32 is located at the middle of the output shaft 13 in an axial direction of the output shaft 13. These first roller 31 and second roller 32 are located in a common plane perpendicular to the axial direction.

The output shaft 13 is supported indirectly by the housing 11 to be able to rotate relative to the housing 11, by the following structures. That is, hollow crankshafts 51L and 51R are loosely fit over both end portions of the output shaft 13 (i.e., are fit over both end portions of the output shaft 13 with a space therebetween). The respective hollow crankshafts 51L and 51R are located on both sides of the second roller 32 formed integrally with the middle of the output shaft 13, with respect to the axial direction. A bearing 52L, 52R is provided in the space given between a center hole 51La, 51Ra of the crankshaft 51L, 51R (a radius of the center hole 51La, 51Ra is denoted by Ri in the drawings) and each of the both end portions of the output shaft 13. Thereby, the output shaft 13 is supported to be able to rotate freely about an axis $O_2$ of the center hole 51La, 51Ra, inside the center hole 51La, 51Ra of the crankshaft 51L and 51R.

Figure 4:
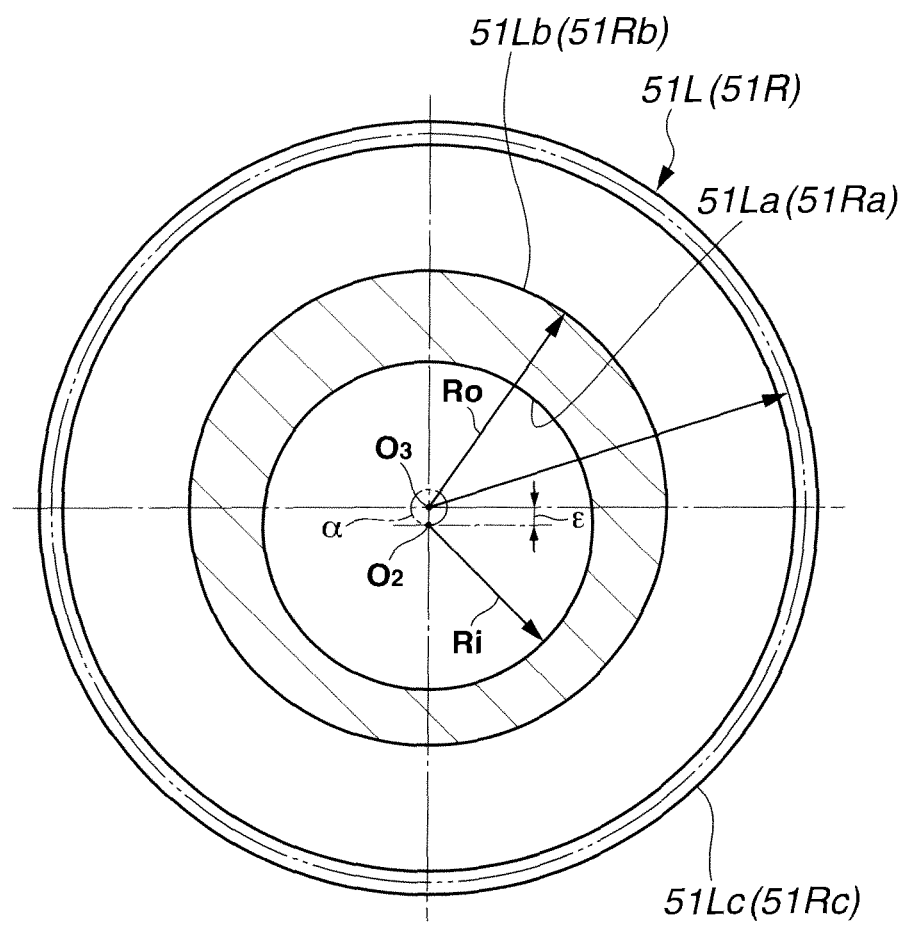
FIG. 4 A front view of a crankshaft used in the drive-force distribution device of FIG. 2, in longitudinal section.

As clearly shown in FIG. 4, each of the crankshafts 51L and 51R has an outer circumferential portion 51Lb, 51Rb (a radius of the outer circumferential portion 51Lb, 51Rb is denoted by Ro in the drawings) which is eccentric relative to (axis $O_2$ of) the center hole 51La, 51Ra. An axis (center line) $O_3$ of the eccentric outer circumferential portion 51Lb, 51Rb is deviated or offset from the axis $O_2$ of the center hole 51La, 51Ra (i.e., from a rotational axis of the second roller 32) by an eccentricity amount ε between the outer circumferential portion 51Lb, 51Rb and the center hole 51La, 51Ra. As shown in FIG. 2, each of the eccentric outer circumferential portions 51Lb and 51Rb of the crankshafts 51L and 51R is supported by a bearing 53L, 53R to be able to rotate inside the corresponding bearing support 23, 25. Hence, each of the bearing supports 23 and 25 is formed with an opening 23b, 25b into which the bearing 53L, 53R is fitted, as shown in FIG. 3 (a) and FIG. 3 (b).

Each of the bearing supports 23 and 25 is the common rotatably-support plate for the input shaft 12 and the output shaft 13, as mentioned above. Since the input shaft 12 and the output shaft 13 are integrally formed respectively with the first roller 31 and the second roller 32, each of the bearing supports 23 and 25 functions also as a common rotatably-support plate for the first roller 31 and the second roller 32. As shown in FIGS. 2 and 3, each of the bearing supports 23 and 25 is not in contact with an inner wall 11a of the housing 11 which is located on a distant side across the input shaft 12 from the output shaft 13. Also, as shown in FIG. 3, each of the bearing supports 23 and 25 is not in contact with an inner wall 11d of the housing 11 which is located on a distant side across the output shaft 13 from the input shaft 12. That is, each of the bearing supports 23 and 25 is formed to have such a size.

Moreover, as shown in FIG. 3, each of the bearing supports 23 and 25 includes a protrusion 23c, 25c and a protrusion 23d, 25d for preventing a swing about the axis $O_1$ of the input shaft 12 (the first roller 31) from occurring. The protrusion 23c, 25c is in contact with a bottom surface of a guide groove 11g formed in an inner surface 11e of the housing 11. On the other hand, the protrusion 23d, 25d is in contact with a bottom surface of a guide groove 11h formed in an inner surface 11f of the housing 11. As shown in FIG. 3 (a), each of the guide grooves 11g and 11h has a narrow shape extending in a tangential direction of the opening 23b, 25b formed in the bearing support 23, 25. Thereby, a displacement of the protrusion 23c, 25c in this tangent direction is not restricted.

As shown in FIG. 2, an axial positioning of the crankshafts 51L and 51R supported rotatably by the bearing supports 23 and 25 as mentioned above is set between the bearing supports 23 and 25 by thrust bearings 54L and 54R together with an axial positioning of the second roller 32.

As shown in FIG. 2, ends of the crankshafts 51L and 51R which face each other are respectively formed integrally with ring gears 51Lc and 51Rc. Each of the ring gears 51Lc and 51Rc is coaxial to the eccentric outer circumferential portion 51Lb, 51Rb, and has same specifications as the eccentric outer circumferential portion 51Lb, 51Rb. These ring gears 51Lc and 51Rc are engaged with a common crankshaft drive pinion 55. At this time, the crankshaft drive pinion 55 is engaged with the ring gears 51Lc and 51Rc under a condition where the eccentric outer circumferential portions 51Lb and 51Rb of the crankshafts 51L and 51R have been arranged to match their rotational positions with each other in a circumferential direction.

The crankshaft drive pinion 55 is connected with a pinion shaft 56. Both ends of the pinion shaft 56 are rotatably supported through bearings 56a and 56b by the housing 11. A right end of the pinion shaft 56 (as viewed in FIG. 2) is fluid-tightly sealed and exposed to an outside of the housing 11. An exposed end surface of the pinion shaft 56 is connected with an output shaft 45a of an inter-roller pressing-force control motor 45 attached to the housing 11, by means of serration fitting or the like. Thereby, the inter-roller pressing-force control motor 45 drives the pinion shaft 56. When the inter-roller pressing-force control motor 45 controls the rotational position of the crankshafts 51L and 51R via the pinion 55 and the ring gears 51Lc and 51Rc, the axis $O_2$ of the output shaft 13 and the second roller 32 moves (turns) along a locus circle α shown by a dotted line of FIG. 4. Accordingly, the inter-roller pressing-force control motor 45, the pinion 55, the ring gears 51Lc and 51Rc and the crankshafts 51L and 51R constitute a second-roller turning means (or a second-roller turning section) according to the present invention.

Since the axis $O_2$ (the second roller 32) turns along the locus circle α of FIG. 4, the second roller 32 approaches the first roller 31 in a radial direction of the first roller 31 as shown in FIGS. 5(a) to 5(c). Thereby, as shown in FIG. 4 (also see FIG. 2), a distance L1 between the axis $O_1$ of the first roller 31 and the axis $O_2$ of the second roller 32 can become smaller than a sum value of a radius of the first roller 31 and a radius of the second roller 32 as a rotation angle θ of the crankshafts 51L and 51R becomes larger. By such a reduction of the inter-roller-axis distance L1, a pressing force of the second roller 32 against the first roller 31 in the radial direction (i.e., a transfer-torque capacity between the rollers) is increased. Thereby, the inter-roller pressing force in the radial direction (the transfer-torque capacity between the rollers) can be controlled to obtain any level thereof in accordance with a reduction degree of the inter-roller-axis distance L1.

Figure 5:
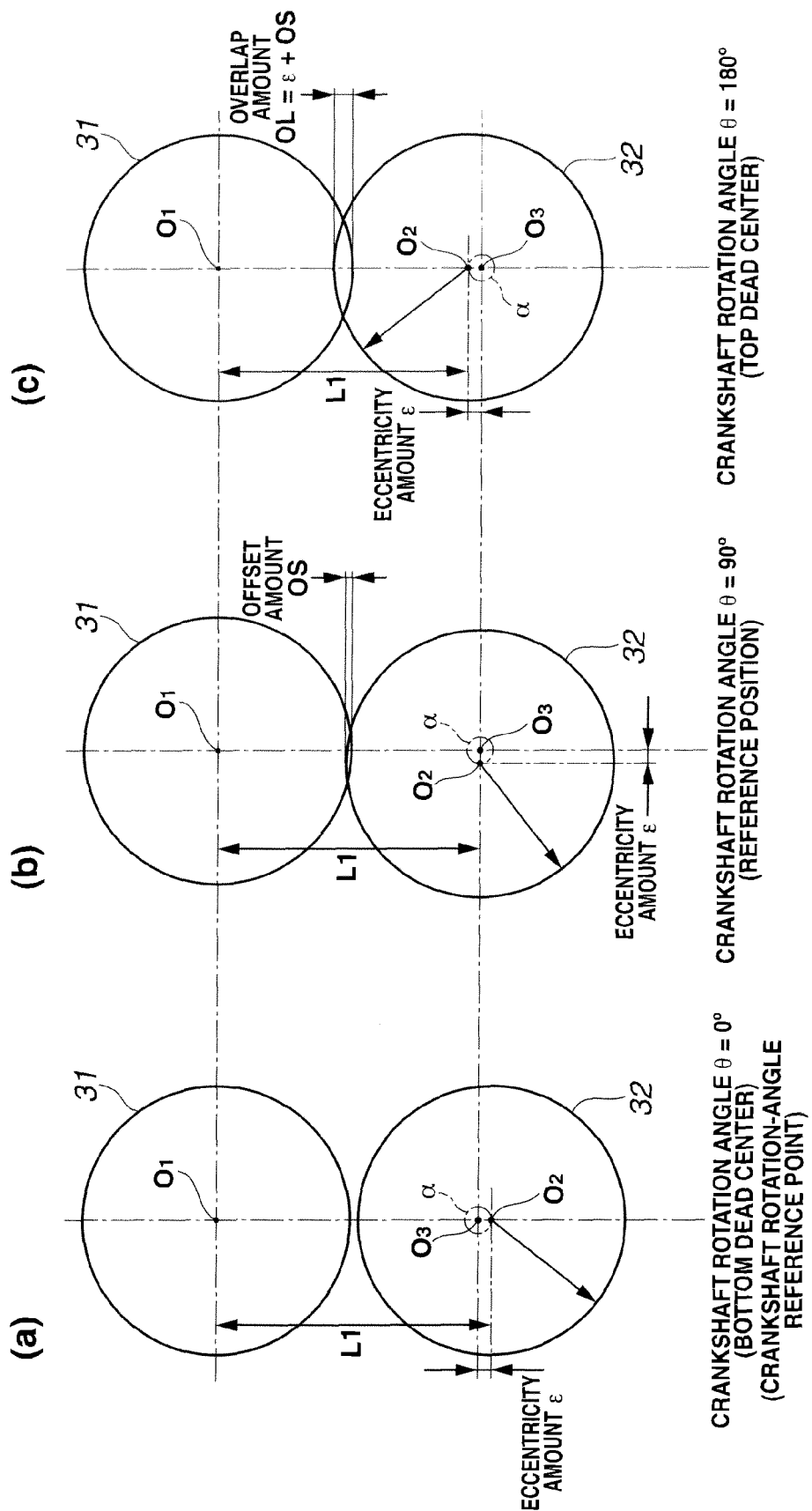
FIG. 5 Views explaining an action of the drive-force distribution device shown in FIG. 2.

As shown in FIG. 5 (a), in this embodiment, the inter-roller-axis distance L1 is set to become larger than the sum value of the radius of the first roller 31 and the radius of the second roller 32, at a bottom dead center at which the inter-axis distance L1 between the first roller 31 and the second roller 32 reaches its peak. At this bottom dead center, the axis $O_2$ of the second roller 32 is located directly underneath the axis $O_3$ of the crankshaft. Thereby, at the bottom dead center where the crankshaft rotation angle θ is equal to 0° (θ=0°), the first roller 31 and the second roller 32 are not pressed to each other in the radial direction so that a state where traction is not transmitted between the rollers 31 and 32 (i.e., a state of a traction-transmission capacity=0) can be obtained. The traction transmission capacity can be controlled freely between the value equal to 0 at the bottom dead center and a maximum value obtainable at a top dead center (θ=180°) shown in FIG. 5(c).

Actually in this embodiment, as mentioned later in detail, a rotation-angle reference point of the crankshafts 51L and 51R is set. Thereby, a value of the crankshaft rotation angle θ at this reference point is defined as 0°, and a rotation amount from this reference point is defined as a magnitude of the crankshaft rotation angle θ. However, for sake of explanatory convenience, explanations will be given by regarding the bottom dead center as the rotation-angle reference point of the crankshafts 51L and 51R, until a setting process for the rotation-angle reference point of the crankshafts is explained below.

The respective crankshaft 51L and the output shaft 13 protrude from the housing 11 (in the left side of FIG. 2). At these protruding portions of the crankshaft 51L and the output shaft 13, a seal ring 57 is interposed between the housing 11 and the crankshaft 51L, and a seal ring 58 is interposed between the crankshaft 51L and the output shaft 13. These seal rings 57 and 58 fluid-tightly seal the respective protruding portions of the crankshaft 51L and the output shaft 13 which protrude from the housing 11.

An end portion of the crankshaft 51L at which the seal rings 57 and 58 are located has an inner radius and outer radius each having a center eccentric in the same manner as the support location of the output shaft 13. The seal ring 57 is interposed between the housing 11 and a radially-outer portion of the end portion of the crankshaft 51L, and the seal ring 58 is interposed between the output shaft 13 and a radially-inner portion of the end portion of the crankshaft 51L. According to such a seal structure, the output shaft 13 can continue to be sealed favorably at its portion protruding from the housing 11, although the axis $O_2$ turns (circularly moves) in response to the above-mentioned turning (circular movement) of the output shaft 13 and the second roller 32.

<Drive-Force Distributing Operation>

The drive force distribution in the above embodiment shown in FIGS. 1 to 5 will now be explained. At least a part of a torque introduced from the transmission 3 (see FIG. 1) to the input shaft 12 of the drive-force distribution device 1 is transmitted from the input shaft 12 directly through the rear propeller shaft 4 and the rear final drive unit 5 (see FIG. 1) to the left and right rear wheels (main drive wheels) 6L and 6R.

On the other hand, in the drive-force distribution device 1 according to this embodiment, in a case that the inter-roller-axis distance L1 is made to be smaller than the sum value of the radiuses of the first and second rollers 31 and 32 by controlling the rotational position of the crankshafts 51L and 51R through the pinion 55 and the ring gears 51Lc and 51Rc by the inter-roller pressing-force control motor 45, these first and second rollers 31 and 32 have the inter-roller transfer-torque capacity according to a mutual radially-pressing force between the first and second rollers 31 and 32. Hence, according to this torque capacity, a part of the torque generated for the left and right rear wheels (main drive wheels) 6L and 6R can be introduced from the first roller 31 through the second roller 32 to the output shaft 13.

A reaction force of the radially pressing force between the first roller 31 and the second roller 32 during torque transmission is received by the bearing supports 23 and 25 which are the common rotatably-support plates. Hence, this reaction force is not transferred to the housing 11. Therefore, it is unnecessary to cause the housing 11 to have a high strength enough to withstand the reaction force of the radially pressing force between the first roller 31 and the second roller 32. Accordingly, the housing 11 is advantageous in weight and in cost.

Then, this torque is transmitted from a left end (as viewed in FIG. 2) of the output shaft 13 through the front propeller shaft 7 (see FIG. 1) and the front final drive unit 8 (see FIG. 1) to the left and right front road-wheels (auxiliary drive wheels) 9L and 9R. Thus, all of the left and right rear wheels (main drive wheels) 6L and 6R and the left and right front wheels (auxiliary drive wheels) 9L and 9R are driven so that the four-wheel-drive running of the vehicle can be attained.

When the rotation angle θ of the crankshafts 51L and 51R is equal to 90° regarded as a reference position as shown in FIG. 5 (b), i.e., when the first roller 31 is in friction-contact with the second roller 32 by being pressed with a radially pressing force corresponding to an offset amount OS during the four-wheel-drive running, power is transmitted to the left and right front wheels (auxiliary drive wheels) 9L and 9R with the traction transmission capacity corresponding to the offset amount OS between the rollers. This offset amount OS is defined when the rotation angle θ is equal to 90° as shown in FIG. 5 (b).

As the rotation angle θ of the crankshafts 51L and 51R is increased by rotating the crankshafts 51L and 51R from the reference position of FIG. 5 (b) toward the top dead center at which the crankshaft rotation angle θ is equal to 180° shown by FIG. 5 (c), the inter-roller-axis distance L1 is further reduced so that a mutual overlap amount OL between the first roller 31 and the second roller 32 becomes larger. As a result, the mutual radially-pressing force between the first roller 31 and the second roller 32 is further increased, so that the traction transmission capacity between these rollers can be further enlarged. When the crankshafts 51L and 51R reach the position of top dead center shown by FIG. 5 (c), the first roller 31 and the second roller 32 are radially pressed to each other with a maximum radially-pressing force corresponding to a maximum value of the overlap amount OL. Thereby, at this time, the traction transmission capacity between these rollers can be maximized. The maximum value of the overlap amount OL is a sum value of the above-mentioned offset amount OS of FIG. 5 (b) and the eccentricity amount ε between the second-roller axis $O_2$ and the crankshaft axis $O_3$.

As is clear from the above explanations, the traction transmission capacity between the rollers can be continuously varied from 0 to its maximum value with the increase of the crankshaft rotation angle θ, by operating the rotation of the crankshaft 51L, 51R from the rotational position of crankshaft rotation angle θ equal to 0° to the rotational position of crankshaft rotation angle θ equal to 180°. On the other hand, the traction transmission capacity between the rollers can be continuously varied from its maximum value to 0 with the decrease of the crankshaft rotation angle θ, by operating the rotation of the crankshaft 51L, 51R from the rotational position of crankshaft rotation angle θ equal to 180° to the rotational position of crankshaft rotation angle θ equal to 0°. Accordingly, the traction transmission capacity between the rollers can be freely controlled by the rotational operation of the crankshaft 51L, 51R.

<Control of Traction Transmission Capacity>

During the four-wheel-drive running, the drive-force distribution device 1 distributes torque to the left and right rear wheels (main drive wheels) 6L and 6R and the left and right front road-wheels (auxiliary drive wheels) 9L and 9R, and thereby outputs a part of the torque to the left and right front road-wheels (auxiliary drive wheels) 9L and 9R, as mentioned above. Hence, the traction transmission capacity between the first roller 31 and the second roller 32 needs to correspond to a target front-wheel drive force which should be outputted to the left and right front road-wheels (auxiliary drive wheels) 9L and 9R. This target front-wheel drive force can be calculated from a target to drive-force distribution ratio between front and rear wheels and a drive force of the left and right rear wheels (main drive wheels) 6L and 6R.

In order to attain a traction transmission-capacity control which satisfies such a demand, a transfer is controller 111 is provided in the first embodiment as shown in FIG. 1. The transfer controller 111 performs a rotational control of the inter-roller pressing-force control motor 45 (a control of the crankshaft rotation angle θ). Therefore, the transfer controller 111 receives a signal derived from an accelerator opening sensor 112, a signal derived from a rear-wheel speed sensor 113, a signal derived from a yaw rate sensor 114 and a signal derived from a motor current sensor 115. The accelerator opening sensor 112 functions to sense an accelerator-pedal depression amount (accelerator opening) APO for varying the output of the engine 2. The rear-wheel speed sensor 113 functions to sense a rotational peripheral speed (circumferential velocity) Vwr of the left and right rear wheels (main drive wheels) 6L and 6R. The yaw rate sensor 114 functions to sense a yaw rate φ given around an vertical axis passing through a barycenter (gravity center) of the vehicle. The motor current sensor 115 functions to sense an electric current i flowing from the transfer controller 111 to the inter-roller pressing-force control motor 45. Moreover, the transfer controller 111 receives a signal derived from a crankshaft rotation-angle sensor 116 for sensing the rotation angle θ of the crankshafts 51L and 51R. The crankshaft rotation-angle sensor 116 is provided inside the housing 11 as shown in FIG. 2. Since the electric current i can be calculated from an internal signal of the transfer controller 111, the motor current sensor 115 is provided in the transfer controller 111 in this embodiment.

Figure 6:
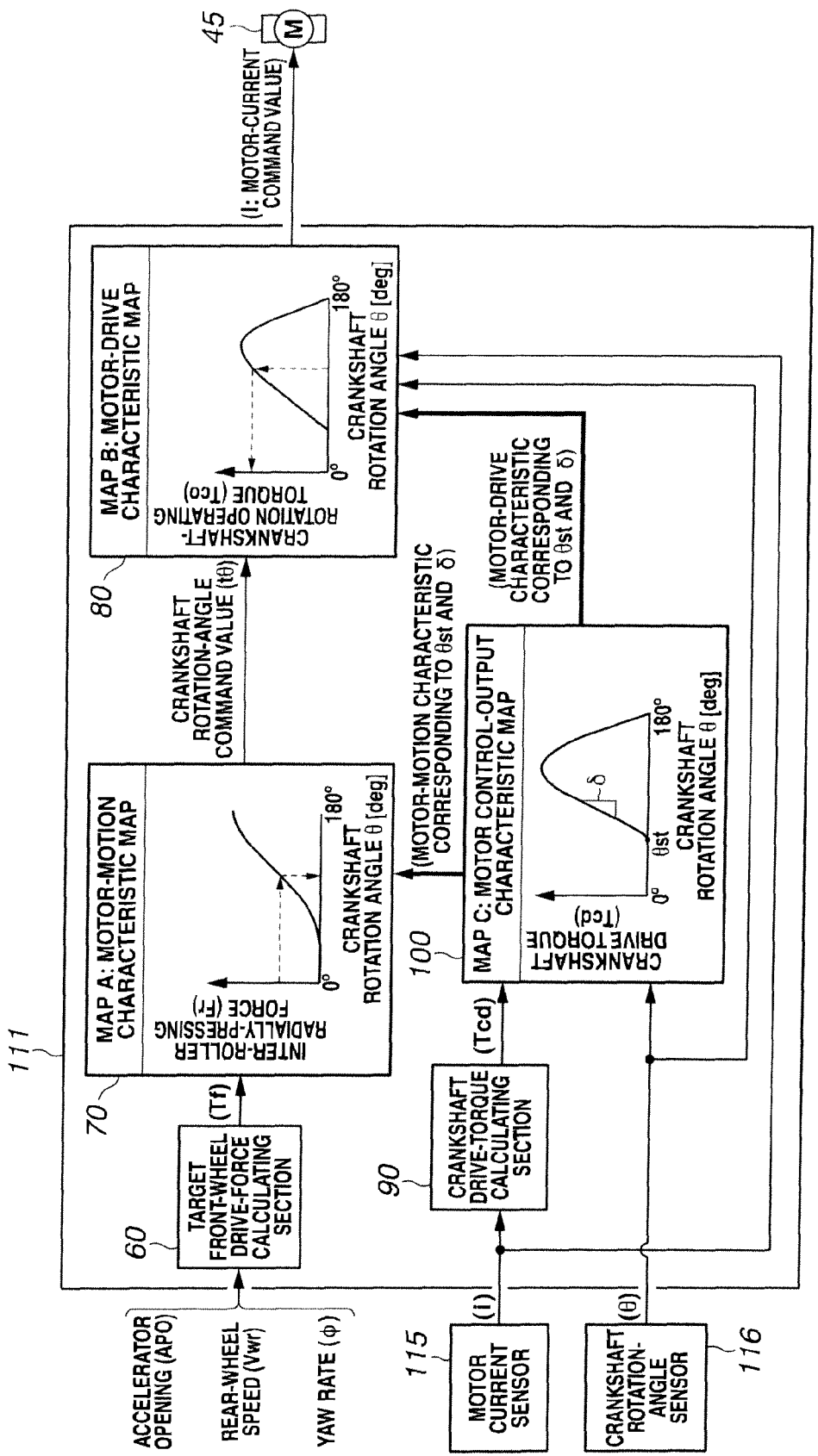
FIG. 6 A block diagram showing respective functions of a transfer controller shown in FIG. 1.

The transfer controller 111 is configured as shown by a block diagram of FIG. 6 in order to perform the traction transmission-capacity control in this embodiment. The transfer controller 111 includes a target front-wheel drive-force calculating section 60, a crankshaft rotation-angle command calculating section 70, a motor control-input calculating section 80, a crankshaft drive-torque calculating section 90 and a motor control-output characteristic obtaining section 100.

The target front-wheel drive-force calculating section 60 receives the accelerator opening APO sensed by the sensor 112, the rear-wheel speed Vwr sensed by the sensor 113 and the yaw rate φ sensed by the sensor 114. By a known method based on these input information, the target front-wheel drive-force calculating section 60 calculates the target drive-force distribution ratio between front and rear wheels and a current drive force of the left and right rear wheels. Then, the target front-wheel drive-force calculating section 60 calculates a target front-wheel drive force Tf which should be outputted to the left and right front wheels (auxiliary drive wheels) 9L and 9R, from the current drive force of the left and right rear wheels and the target drive-force distribution ratio between front and rear wheels.

The crankshaft rotation-angle command calculating section 70, at first, calculates an inter-roller radially-pressing force Fr necessary for the first and second rollers 31 and 32 to transmit the target front-wheel drive force Tf, by a map searching or the like from the target front-wheel drive force Tf. Next, the crankshaft rotation-angle command calculating section 70 calculates a crankshaft rotation-angle command value tθ necessary to attain a traction transmission capacity which can transmit the target front-wheel drive force Tf, from the inter-roller radially-pressing force Fr corresponding to the target front-wheel drive force Tf, with reference to a motor-motion characteristic map (hereinafter also referred to as, map A) calculated by an after-mentioned learning. This motor-motion characteristic map represents a relation between the inter-roller radially-pressing force Fr and the crankshaft rotation angle θ which is a control-output motion amount of the inter-roller pressing-force control motor 45 (the second-roller turning means).

The motor control-input calculating section 80 receives the crankshaft rotation-angle command value tθ. The motor control-input calculating section 80 calculates a crankshaft-rotation operating torque (crankshaft rotation-angle realizing drive force) Tco necessary to attain the crankshaft rotation-angle command value tθ, as a target drive torque of the motor 45, with reference to a motor-drive characteristic map (hereinafter also referred to as, map B) calculated by an after-mentioned learning. This motor-drive characteristic map represents a relation between the crankshaft-rotation operating torque Tco which is determined by a control input of the motor 45 (the second-roller turning means) and the crankshaft rotation angle θ which is the control-output motion amount of the motor 45. Moreover, the motor control-input calculating section 80 calculates a motor-current command value I which is the control input of the motor 45 (the second-roller turning means) and which is necessary to generate the target drive torque of the motor 45 so as to attain the crankshaft rotation-angle command value tθ. Then, the motor control-input calculating section 80 supplies this motor-current command value I to the motor 45. In the motor 45, the motor drive current i which is an actual control input of the motor 45 is controlled by the motor-current command value I with a predetermined response.

When the inter-roller pressing-force control motor 45 is driven by such a value of the current i, the motor 45 brings the rotation angle θ of each crankshaft 51L, 51R to the command value tθ with the predetermined response, so that the first roller 31 and the second roller 32 become radially in press-contact with each other by a force corresponding to the command value tθ. Thereby, the traction transmission capacity between these rollers 31 and 32 can be controlled to become equal to a value that transmits the target front-wheel drive force Tf to the left and right front wheels (auxiliary drive wheels) 9L and 9R.

In a case that each of the motor-motion characteristic map (map A) which is used in the crankshaft rotation-angle command calculating section 70 and the motor-drive characteristic map (map B) which is used in the motor control-input calculating section 80 is one type of fixed data which was previously calculated by experiments and the like, there is a possibility that this fixed data does not match an actual state of hardware due to the manufacturing variability and errors in dimension and the like or has become less matched with the actual state of hardware. At this time, a problem that the control of traction transmission capacity becomes inaccurate is caused as follows.

Specifically, the overlap amount OL between the first roller 31 and the second roller 32 that is decisive in producing the traction transmission capacity is exaggerated for purposes of illustration in FIG. 5 (c). However, actually, the overlap amount OL is slight, and hence, is greatly influenced by the manufacturing variability and errors in dimension or the like. Therefore, there is a possibility that each of the motor-motion characteristic map (map A) which is used in the crankshaft rotation-angle command calculating section 70 and the motor-drive characteristic map (map B) which is used in the motor control-input calculating section 80 differs from the actual state of hardware due to the inevitable manufacturing variability and errors in dimension or the like.

Figure 7:
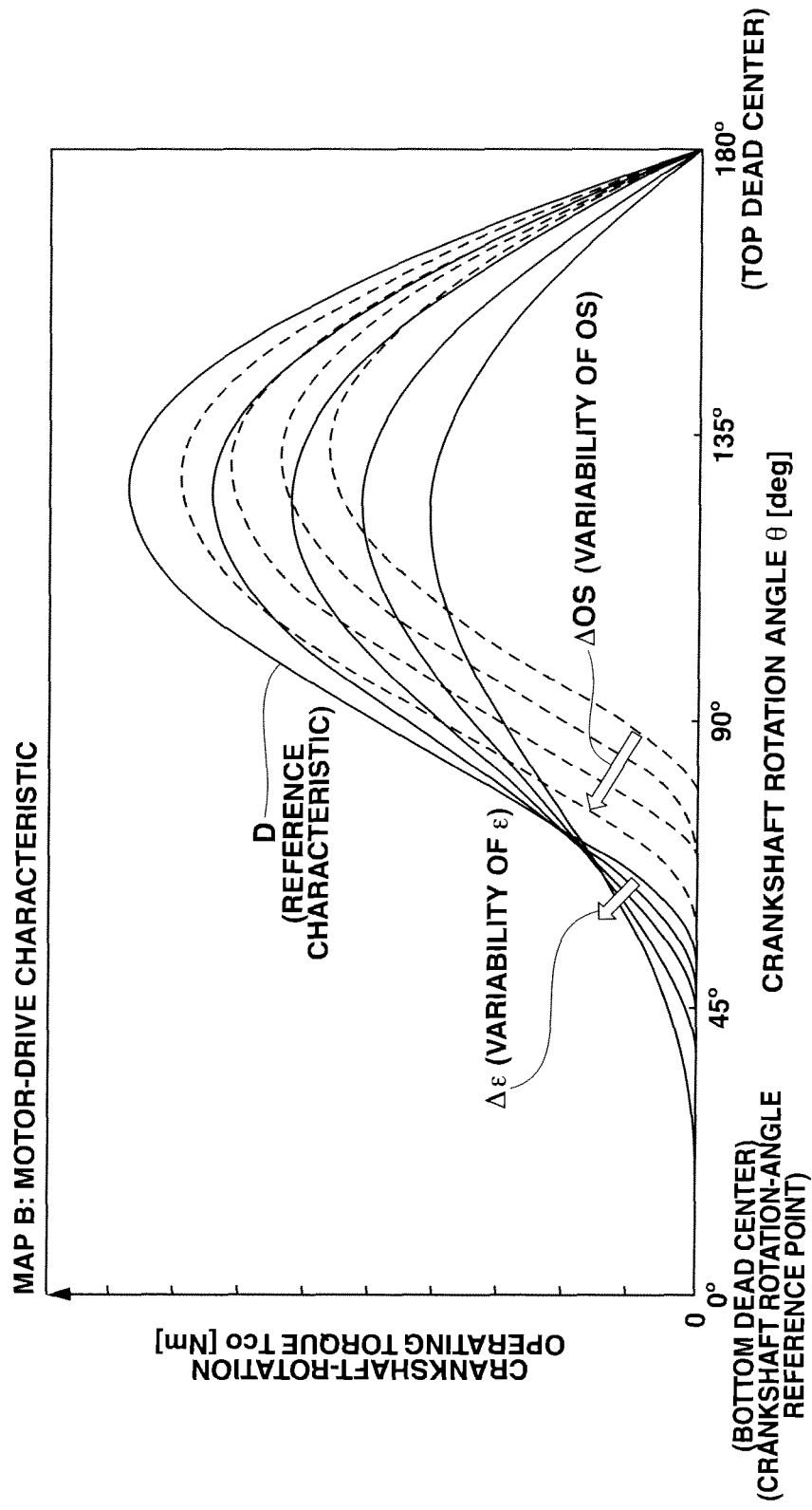
FIG. 7 A view of characteristic lines each showing a motor drive characteristic that is a relation between the crankshaft rotation angle and a crankshaft-rotation operating force in the drive-force distribution device of FIG. 2.

There are two main types of factors that cause a variability (variance) in the inter-roller overlap amount OL. One of the two main types of factors is a variability (variance) $\Delta\epsilon$ in the eccentricity amount $\epsilon$ given between the crankshaft axis $O_3$ and the second-roller axis $O_2$ shown in FIGS. 2 and 3. Another of the two main types of factors is a variability $\Delta OS$ in the offset amount OS shown in FIG. 5 (b). The motor-drive characteristic map (map B) which is used in the motor control-input calculating section 80 shown in FIG. 6, i.e., a relational map between the crankshaft rotation angle $\theta$ and the crankshaft-rotation operating torque (crankshaft rotation-angle realizing drive force) Tco necessary to realize or attain this crankshaft rotation angle $\theta$ is more shifted in an arrow direction from a reference characteristic D in which the variability $\Delta\epsilon$ is equal to 0, as the variability $\Delta\epsilon$ of the eccentricity amount $\epsilon$ between the axis $O_3$ and the axis $O_2$ becomes larger, as shown in FIG. 7. Moreover, the motor-drive characteristic map (map B) is more shifted in another arrow direction as the variability (variance) $\Delta OS$ of the offset amount OS becomes larger.

For descriptive purposes, only five characteristic lines which are shifted according to the variability (variance) $\Delta\epsilon$ of the eccentricity amount $\epsilon$ and only five characteristic lines which are shifted according to the variability (variance) $\Delta OS$ of the offset amount OS are shown in FIG. 7. However, in a case that five types of characteristic lines which change according to the variability $\Delta\epsilon$ and five types of characteristic lines which change according to the variability $\Delta OS$ are mapped, each characteristic line shown according to the variability $\Delta\epsilon$ actually has its five characteristic lines which change according to the variability $\Delta OS$. That is, exactly, a total of 25 variability characteristic lines are present in this case.

Figure 8:
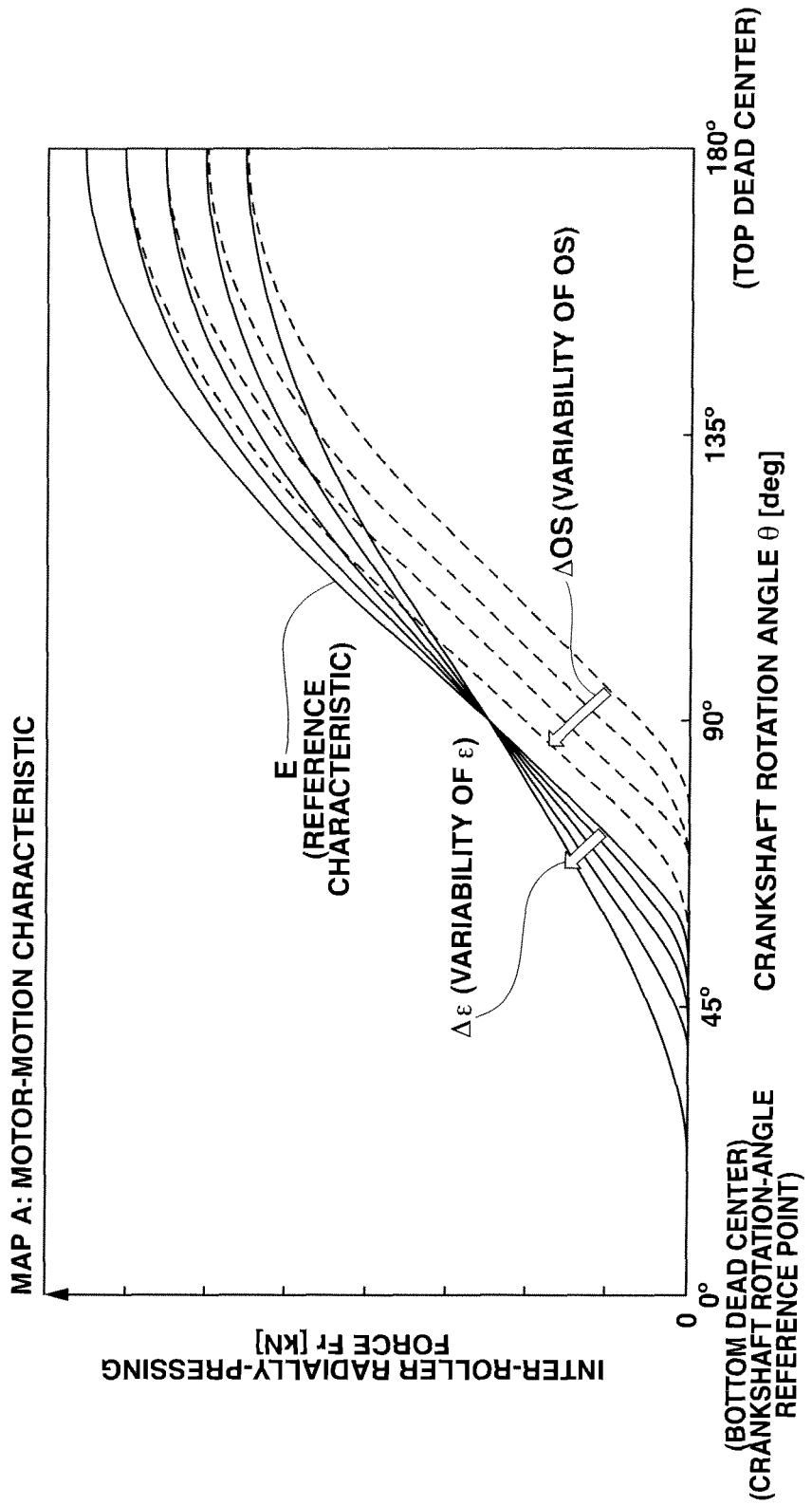
FIG. 8 A view of characteristic lines each showing a motor motion characteristic that is a relation between the crankshaft rotation angle and a radially pressing force between the first roller and the second roller in the drive-force distribution device of FIG. 2.

The motor-motion characteristic map (map A) which is used in the crankshaft rotation-angle command calculating section 70 shown in FIG. 6, i.e., a relational map between the inter-roller radially-pressing force Fr and the crankshaft rotation angle $\theta$ which is the control-output motion amount of the motor 45 (the second-roller turning means) is more shifted in an arrow direction from a reference characteristic E in which the variability $\Delta\epsilon$ is equal to 0, as the variability $\Delta\epsilon$ of the eccentricity amount $\epsilon$ becomes larger, as shown in FIG. 8. Moreover, the motor-motion characteristic map (map A) is more shifted in another arrow direction as the variability $\Delta OS$ of the offset amount OS becomes larger. That is, this motor-motion characteristic map (map A) is shifted in response to the shift of the motor-drive characteristic map (map B) according to the variability $\Delta\epsilon$ of the eccentricity amount $\epsilon$ and the variability $\Delta OS$ of the offset amount OS shown in FIG. 7.

For descriptive purposes, only five characteristic lines which are shifted according to the variability (variance) $\Delta\epsilon$ of the eccentricity amount $\epsilon$ and only five characteristic lines which are shifted according to the variability (variance) $\Delta OS$ of the offset amount OS are shown in FIG. 8. However, in a case that five types of characteristic lines which change according to the variability $\Delta\epsilon$ and five types of characteristic lines which change according to the variability $\Delta OS$ are mapped, each characteristic line shown according to the variability $\Delta\epsilon$ actually has its five characteristic lines which change according to the variability $\Delta OS$ in the same manner as the case of FIG. 7. That is, exactly, a total of 25 variability characteristic lines are present in this case.

In a case that each of the motor-motion characteristic map (map A) which is used in the crankshaft rotation-angle command calculating section 70 and the motor-drive characteristic map (map B) which is used in the motor control-input calculating section 80 shown in FIG. 6 has been shifted due to the variability $\Delta OS$ of the offset amount OS and the variability $\Delta\epsilon$ of the eccentricity amount $\epsilon$ between the axis $O_2$ and the axis $O_3$ as mentioned above in FIGS. 7 and 8 so that these maps do not match the actual state of hardware, an accuracy of the traction-transmission capacity control is worsened.

That is, if the motor-drive characteristic map (map B) and the motor-motion characteristic map (map A) have become less matched with the actual state of hardware due to the variability $\Delta OS$ of the offset amount OS and the variability $\Delta\epsilon$ of the eccentricity amount $\epsilon$ between the axis $O_2$ and the axis $O_3$ as mentioned above, the crankshaft rotation-angle command value $t\theta$ calculated based on the motor-motion characteristic map (map A) by the crankshaft rotation-angle command calculating section 70 causes an excess or shortage relative to a target value of the inter-roller radially-pressing force Fr for transmitting the target front-wheel drive force Tf. Further in this case, the crankshaft-rotation operating torque Tco (motor-current command value I) calculated based on the motor-drive characteristic map (map B) by the motor control-input calculating section 80 causes an excess or shortage relative to the crankshaft rotation-angle command value $t\theta$. In either event, the traction transmission capacity has an excess or shortage relative to a target capacity for transmitting the target front-wheel drive force Tf.

If the traction transmission capacity is excessive as compared with the target capacity for transmitting the target front-wheel drive force Tf, a problem is caused that a surplus driving energy of the motor 45 is consumed to incur a reduction of energy efficiency. On the other hand, if the traction transmission capacity is short as compared with the target capacity for transmitting the target front-wheel drive force Tf, a problem is caused that the drive-force distribution ratio between front and rear wheels becomes unable to be controlled on target.

Therefore, in this embodiment, a crankshaft drive-torque calculating section 90 and a motor control-output characteristic obtaining section 100 are provided as shown in FIG. 6 in order to reliably prevent the accuracy of the traction transmission-capacity control from being reduced due to the variability $\Delta OS$ of the offset amount OS and the variability $\Delta\epsilon$ of the eccentricity amount $\epsilon$ between the axis $O_2$ and the axis $O_3$. Thereby, the accuracy of the traction transmission-capacity control can be kept high.

While the motor 45 is being driven by the current to increase the crankshaft rotation angle $\theta$ from 0° to 180° at the time of factory shipment or every predetermined-distance running of the vehicle, the crankshaft drive-torque calculating section 90 and the motor control-output characteristic obtaining section 100 function as follows. The crankshaft drive-torque calculating section 90 reads the motor drive current i of the inter-roller pressing-force control motor 45 which is detected by the sensor 115, and calculates a crankshaft drive torque Tcd (i.e., a control-output torque from the motor 45 to the crankshafts 51L and 51R) given when the motor 45 is driven with this current i, by means of map searching or the like.

Figure 9:
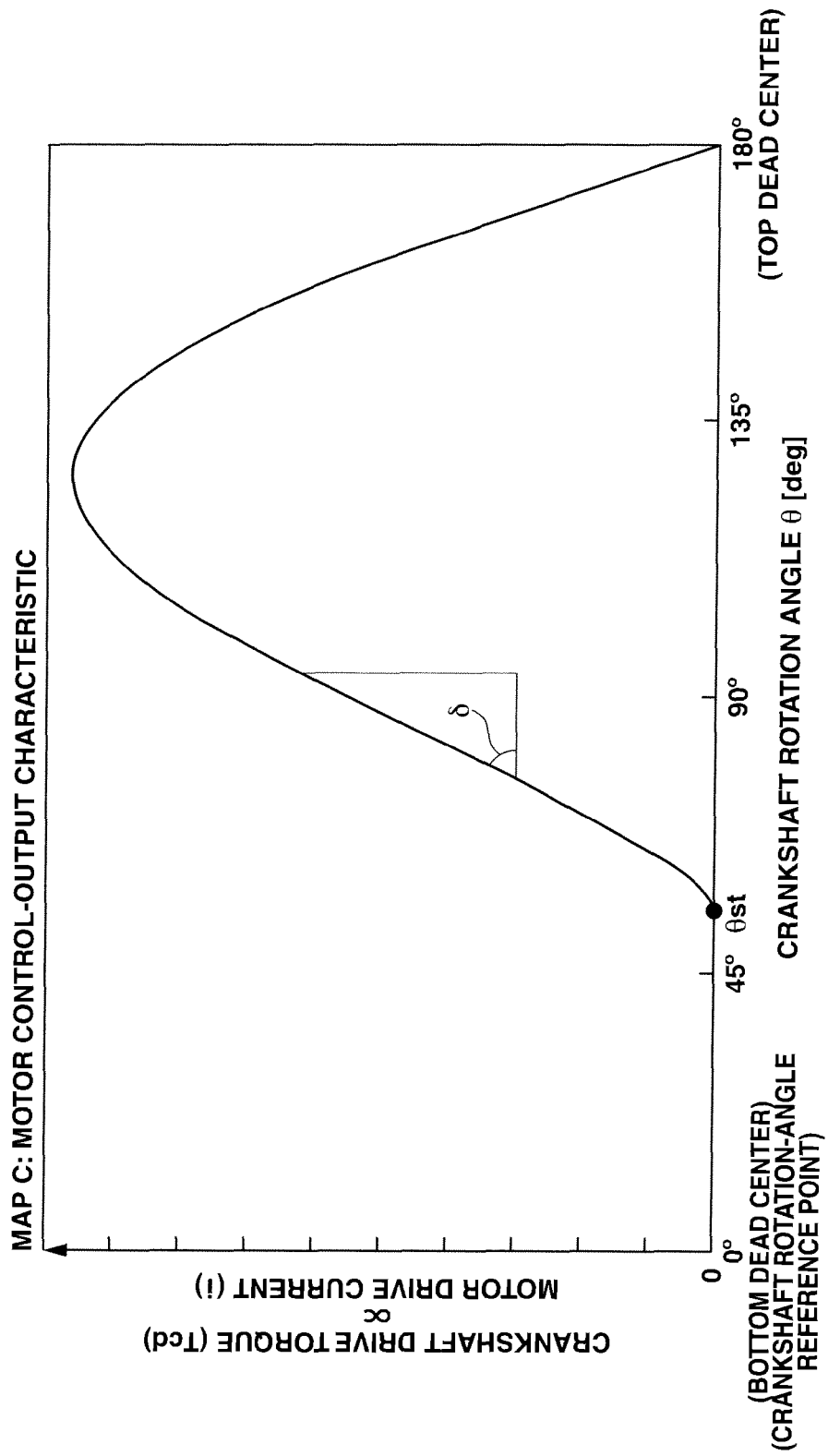
FIG. 9 A view of characteristic line showing a motor control-output characteristic that is a relation between the crankshaft rotation angle and a crankshaft drive torque calculated from an electric-current value inputted to the motor for driving the crankshaft, in the drive-force distribution device of FIG. 2.

The motor control-output characteristic obtaining section 100 receives the crankshaft drive torque Tcd (control-output torque of the motor 45) and the crankshaft rotation angle $\theta$ (control-output motion amount of the motor 45) detected by the sensor 116, and plots these crankshaft drive torque Tcd and crankshaft rotation angle $\theta$ on a two-dimension coordinates of FIG. 9. Thereby, the motor control-output characteristic obtaining section 100 obtains a motor control-output characteristic map (hereinafter also referred to as, map C) as shown in FIG. 9. This motor control-output characteristic map represents a relation between the crankshaft drive torque Tcd (the control-output torque of the motor 45 serving as the second-roller turning means) and the crankshaft rotation angle θ (the control-output motion amount of the motor 45 serving as the second-roller turning means).

Hence, the motor control-output characteristic map (map C) of FIG. 9 involves the influence of the variability ΔOS of the offset amount OS and the variability Δε of the eccentricity amount ε. That is, the map C of FIG. 9 is a motor control-output characteristic map given based on a current value of the offset amount OS and a current value of the eccentricity amount ε between the axis $O_2$ and the axis $O_3$, and hence, matches the actual state of hardware. After the motor control-output characteristic map (map C) of FIG. 9 is obtained as mentioned above, a control-output-torque generation-start crankshaft rotation angle θst and a variation gradient δ (control-output-torque variation gradient) of the crankshaft drive torque Tcd (the control output torque of the motor 45) are obtained from the map C. The control-output-torque generation-start crankshaft rotation angle θst is a value of the crankshaft rotation angle θ when the crankshaft drive torque Tcd (the control output torque of the motor 45 serving as the second-roller turning means) starts to rise. The variation gradient δ is a gradient of the crankshaft drive torque Tcd with respect to the crankshaft rotation angle θ (the control-output motion amount of the motor 45 serving as the second-roller turning means). Then, from the control-output-torque generation-start crankshaft rotation angle θst and the variation gradient δ, the current value of the offset amount OS and the current value of the eccentricity amount ε can be obtained.

By applying this principle, the motor control-output characteristic obtaining section 100 calculates the current values of the offset amount OS and the eccentricity amount ε. Then, the motor control-output characteristic obtaining section 100 selects a graph of the motor-drive characteristic corresponding to the current values of the offset amount OS and the eccentricity amount ε, from the graphs of the motor-drive characteristic depicted every value of the eccentricity amount ε and every value of the offset amount OS as exemplified in FIG. 7. Then, the motor control-output characteristic obtaining section 100 replaces the motor-drive characteristic map (map B) which is used in the motor control-input calculating section 80 with the selected motor-drive characteristic, so that a learning is carried out. Afterwards, the motor control-input calculating section 80 performs the above mentioned calculations by using the learned motor-drive characteristic map (map B).

The motor control-output characteristic map (map C) of FIG. 9 which is obtained by the motor control-output characteristic obtaining section 100 has a lateral axis and a vertical axis corresponding to those of the motor-drive characteristic map (map B) which is used in the motor control-input calculating section 80. Hence, the motor control-output characteristic obtaining section 100 may replace the motor-drive characteristic map (map B) with the motor control-output characteristic map (map C) of FIG. 9, when carrying out the above-mentioned learning of the motor-drive characteristic map (map B) which is used in the motor control-input calculating section 80.

Moreover, the motor control-output characteristic obtaining section 100 selects a graph of the motor-motion characteristic corresponding to the current values of the offset amount OS and the eccentricity amount ε calculated from FIG. 9 as mentioned above, from the graphs of the motor-motion characteristic depicted every value of the eccentricity amount ε and every value of the offset amount OS as exemplified in FIG. 8. Then, the motor control-output characteristic obtaining section 100 replaces the motor-motion characteristic map (map A) which is used in the crankshaft rotation-angle command calculating section 70 with the selected motor-motion characteristic, so that a learning is carried out. Afterwards, the crankshaft rotation-angle command calculating section 70 performs the above mentioned calculations by using the learned motor-motion characteristic map (map A).

For descriptive purposes, only five characteristic lines which are shifted from one another according to the variability Δε of the eccentricity amount ε and only five characteristic lines which are shifted from one another according to the variability ΔOS of the offset amount OS are exemplified in FIGS. 7 and 8. However, as a matter of course, an accuracy of the above learning becomes higher as each of the number of characteristic lines which are shifted from one another according to the variability Δε of the eccentricity amount ε and the number of characteristic lines which are shifted from one another according to the variability ΔOS of the offset amount OS becomes larger.

For sake of explanatory convenience for facilitating understanding, in the above explanations, a value of the crankshaft rotation angle θ given at the bottom dead center is defined as 0° by regarding the bottom dead center as the reference point, and the traction transmission-capacity control is performed based on a value of the crankshaft rotation angle θ advanced/retarded from this reference point. Although the bottom dead center is clear as a wording, it is not easy to actually set a mechanical bottom dead center for the traction transmission-capacity control. Moreover, this mechanically-actual bottom dead center varies due to the manufacturing variability and errors in dimension or the like of the drive force distribution device. From such reasons, until now, it has been difficult to set the reference point of the crankshaft rotation angle θ.

If the reference point of the crankshaft rotation angle θ has not yet been determined, a problem is caused that the traction transmission-capacity control based on the crankshaft rotation angle θ is not performed to satisfy its targets because the position of θ=0° is not settled. Particularly, in a case that the reference point (the position of θ=0°) of the crankshaft rotation angle θ has not yet been fixed to an accurate position matching the actual state; the control-output-torque generation-start crankshaft rotation angle θst of FIG. 9 cannot be accurately obtained even if the motor control-output characteristic obtaining section 100 obtains the motor control-output characteristic map (map C) as exemplified in FIG. 9 which represents the relation between the crankshaft drive torque Tcd and the crankshaft rotation angle θ

If the control-output-torque generation-start crankshaft rotation angle θst is not accurate, the current values of the eccentricity amount ε and the offset amount OS which are determined from the control-output-torque generation-start crankshaft rotation angle θst and the variation gradient δ of the crankshaft drive torque Tcd relative to the crankshaft rotation angle θ are also not accurate. Thereby, the learning of the motor-motion characteristic map (map A) and the learning of the motor-drive characteristic map (map B) based on these current values of the eccentricity amount ε and the offset amount OS become inaccurate, so that the traction transmission-capacity control is not performed to satisfy its targets.

This embodiment according to the present invention uses the following fact which has been found. That is, when the motor 45 turns the second roller 32 through the crankshafts 51L and 51R to both sides between which the position shown in FIG. 5 (a) is sandwiched, a variation characteristic of the crankshaft-rotation operating torque Tco relative to the crankshaft rotation angle ±θ makes a symmetrical waveform with respect to a line between a case that the second roller 32 is turned in a direction (positive direction) of FIG. 5 (b) and a case that the second roller 32 is turned in a counter direction (reverse direction) of that of FIG. 5 (b). A position of the crankshaft rotation angle which corresponds to a center of this waveform can be obtained and set easily and reliably, and moreover, is not influenced by the manufacturing variability or errors in dimension and the like of the drive force distribution device. On the basis of such a fact-recognition, in this embodiment, the position of the crankshaft rotation angle which corresponds to the center of the symmetrical waveform is set as the reference point (the position of θ=0°) of the crankshaft rotation angle θ.

Figure 10:
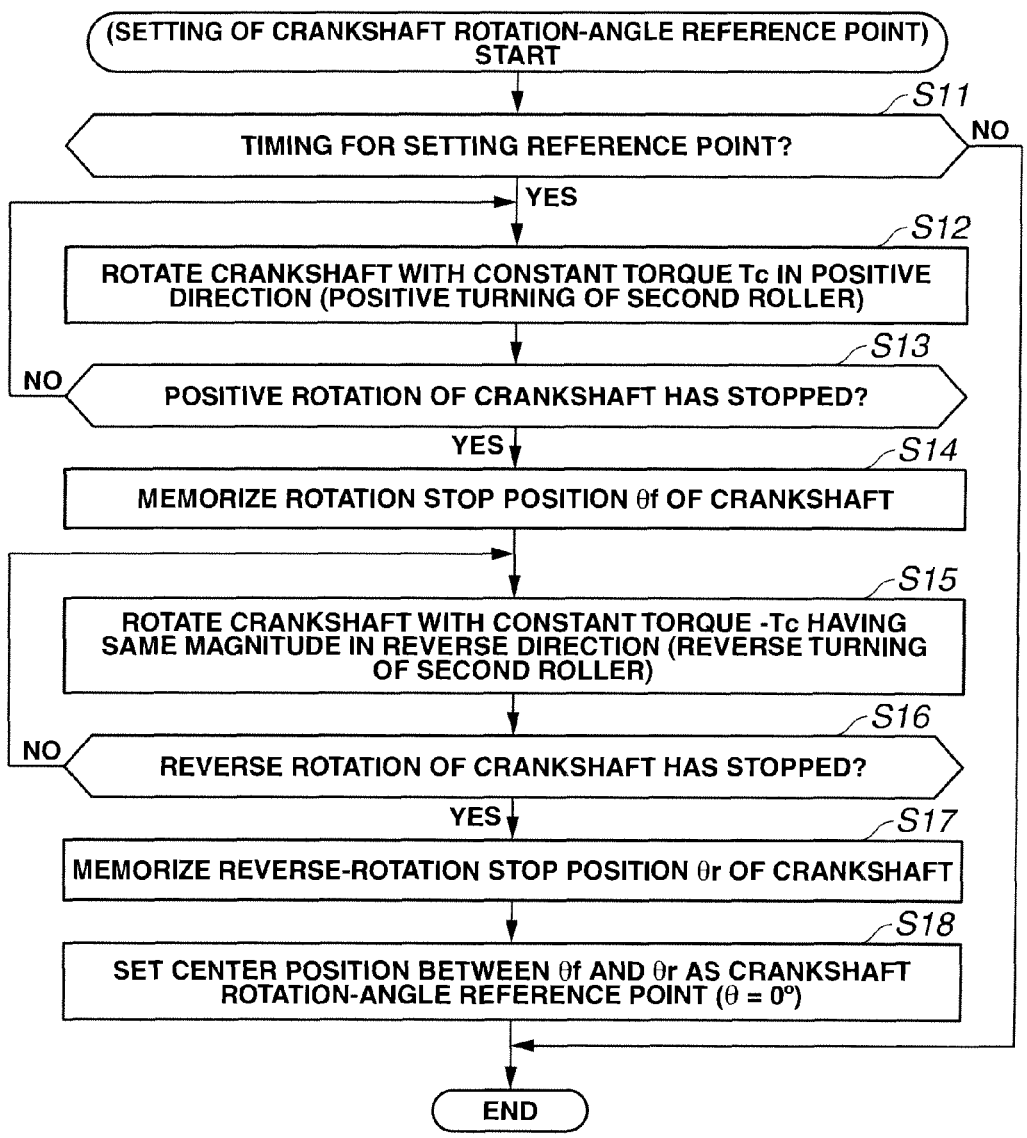
FIG. 10 A flowchart of a control program that is executed when the transfer controller shown in FIG. 1 sets the reference point of the crankshaft rotation angle.
Figure 11:
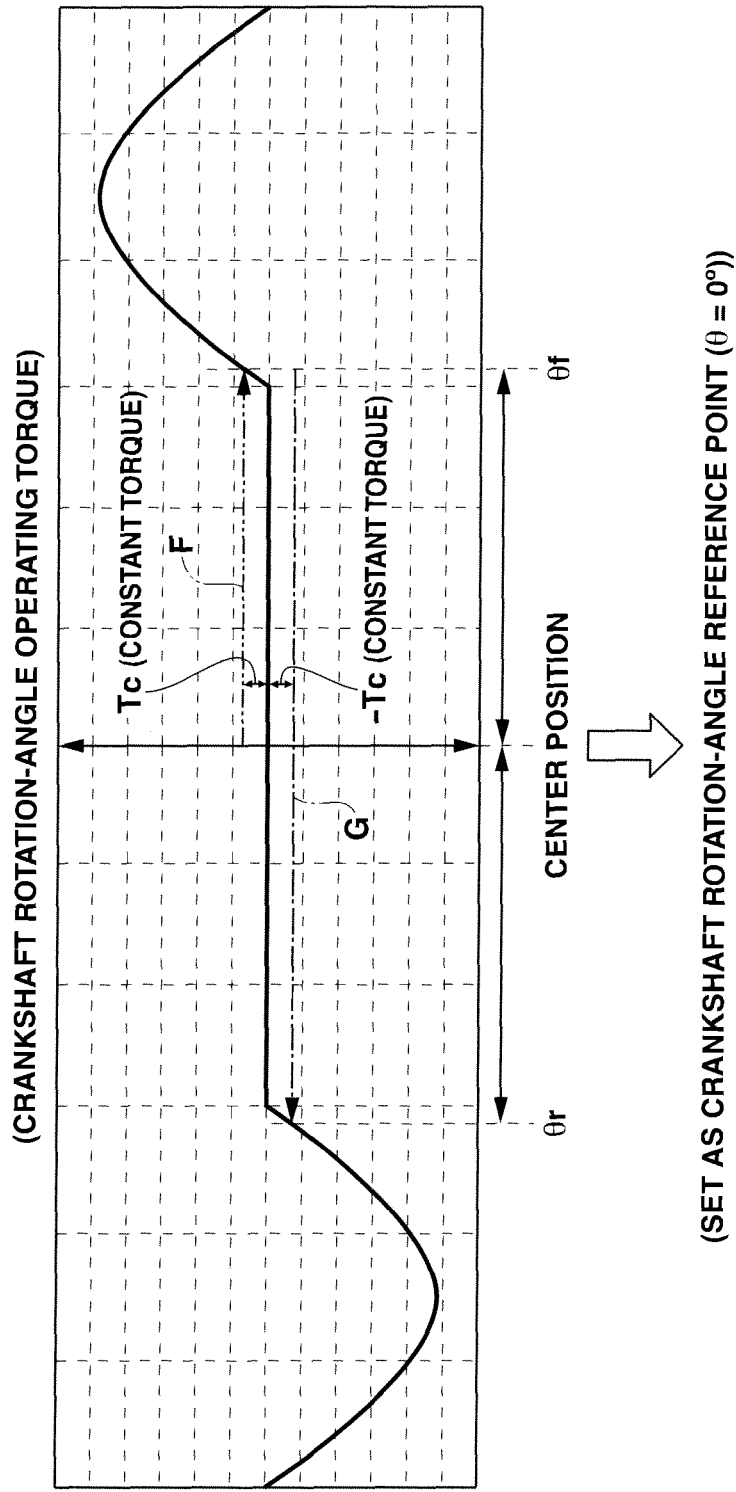
FIG. 11 An explanatory view showing a setting procedure of the crankshaft rotation-angle reference point by the control program of FIG. 10.

Therefore, in this embodiment, the transfer controller 111 shown in FIG. 1 sets the rotation-angle reference point of the crankshafts 51L and 51R by a procedure shown in FIG. 11, by executing a control program shown in FIG. 10. At step S11 of FIG. 10, the controller 111 judges whether or not a timing for setting the rotation-angle reference point of the crankshafts has just come. The setting of the crankshaft-rotation-angle reference point is carried out, for example, at the time of factory shipment or every predetermined-distance running of the vehicle. At timings other than such timings for setting the crankshaft-rotation-angle reference point, the control program of FIG. 10 is terminated.

When the timing for setting the crankshaft-rotation-angle reference point has just come, the program proceeds from step S11 to step S12. At step S12, the motor 45 drives the crankshafts 51L and 51R in its positive direction (see, an arrow F of FIG. 11) with a positive constant torque Tc, so that the second roller 32 is turned in the direction (positive direction) of FIG. 5 (b). By this turning of the second roller 32, the outer circumferential surface of the second roller 32 is pressed to the outer circumferential surface of the first roller 31. Then, the second roller 32 becomes unable to turn at its position corresponding to a magnitude of the constant torque Tc. Also, the crankshafts 51L and 51R stop at its rotational position corresponding to the magnitude of the constant torque Tc.

At step S13, the controller judges whether or not the positive rotation of the crankshafts 51L and 51R has already stopped as mentioned above. Until the positive rotation of the crankshafts 51L and 51R stops by itself, the motor 45 continues to rotate the crankshafts 51L and 51R in its positive direction with the positive constant torque Tc by repeating the processing of step S12. When the positive rotation of the crankshafts 51L and 51R has just stopped because the second roller 32 has become unable to turn any more after the outer circumferential surface of the second roller 32 was pressed to the outer circumferential surface of the first roller 31 by the positive rotation of the crankshafts 51L and 51R (the positive turning of the second roller 32), the program proceeds from step S13 to step S14. At this time, the controller stores a positive-rotation stop position θf (see FIG. 11) of the crankshafts 51L and 51R, at step S14. Therefore, steps S12 to S14 correspond to a one-direction turning-stop-position detecting means (or, one-direction turning-stop-position detecting section) according to the present invention.

At next step S15, the controller causes the motor 45 to drive the crankshafts 51L and 51R in the reverse direction (see, an arrow G of FIG. 11) with a negative constant torque −Tc, so that the second roller 32 is turned in a direction (negative direction) counter to FIG. 5 (b). By this turning of the second roller 32, the outer circumferential surface of the second roller 32 is pressed to the outer circumferential surface of the first roller 31. Then, the second roller 32 becomes unable to turn at its position corresponding to a magnitude of the constant torque −Tc. Also, the crankshafts 51L and 51R stop at its rotational position corresponding to the magnitude of the constant torque −Tc.

At step S16, the controller judges whether or not the reverse rotation of the crankshafts 51L and 51R has already stopped as mentioned above. Until the reverse rotation of the crankshafts 51L and 51R stops by itself, the motor 45 continues to rotate the crankshafts 51L and 51R in its reverse direction with the negative constant torque −Tc by repeating the processing of step S15. When the reverse rotation of the crankshafts 51L and 51R has just stopped because the second roller 32 has become unable to turn any more after the outer circumferential surface of the second roller 32 was pressed to the outer circumferential surface of the first roller 31 by the counter-directional rotation of the crankshafts 51L and 51R (the reverse turning of the second roller 32), the program proceeds from step S16 to step S17. At this time, the controller stores a reverse-rotation stop position θr (see FIG. 11) of the crankshafts 51L and 51R, at step S17. Therefore, steps S15 to S17 correspond to an another-direction turning-stop-position detecting means (or, another-direction turning-stop-position detecting section) according to the present invention.

The above-mentioned positive constant torque Tc and negative constant torque −Tc have magnitudes (absolute values) equal to each other. As a matter of course, each of the positive constant torque Tc and the negative constant torque −Tc needs to have a level capable of producing the above-mentioned turning of the second roller 32. Moreover, it is preferable that each of the positive constant torque Tc and the negative constant torque −Tc has a level that stops the turning of the second roller 32 (stops the rotation of the crankshafts 51L and 51R) immediately after the outer circumferential surface of the second roller 32 starts to be in contact with the outer circumferential surface of the first roller 31. That is, it is preferable that each magnitude of the positive constant torque Tc and the negative constant torque −Tc is a minimum torque value necessary to cause the outer circumferential surface of the second roller 32 to become in contact with the outer circumferential surface of the first roller 31.

At step S18, the controller set a center position between the positive-rotation stop position θf of the crankshafts 51L and 51R which was stored at step S14 and the reverse-rotation stop position θr of the crankshafts 51L and 51R which was stored at step S17, as the crankshaft-rotation-angle reference point (turning-motion reference point of the second roller). That is, as shown in FIG. 11, a crankshaft rotation-angle variation amount Δθfr between the positive-rotation stop position θf and the reverse-rotation stop position θr is divided by 2 to obtain a rotation-angle variation amount Δθfr/2. Thereby, a position which is located between the positive-rotation stop position θf and the reverse-rotation stop position θr and which is located away from the positive-rotation stop position θf and the reverse-rotation stop position θr by the rotation-angle variation amount Δθfr/2 is set as the crankshaft-rotation-angle reference point (turning-motion reference point of the second roller). A value of the crankshaft rotation angle θ at this reference point is defined as 0°. Therefore, step S18 corresponds to a second-roller turning-motion reference-point setting means (or, second-roller turning-motion reference-point setting section) according to the present invention.

The transfer controller 111 shown in FIG. 1 regards the crankshaft-rotation-angle reference point (crankshaft rotation angle θ=0°) set as above, as a base point. On the basis of a value of the crankshaft rotation angle θ from this base point, the transfer controller 111 performs the traction transmission-capacity control such as the judgment of the control-output-torque generation-start crankshaft rotation angle θst of FIG. 9.

OPERATIONS AND EFFECTS

According to the above-explained traction transmission-capacity control in this embodiment, the positive-rotation stop position θf at which the turning of the second roller 32 stops after the motor 45 starts to turn the second roller 32 through the crankshafts 51L and 51R with the constant torque Tc in the positive direction is calculated (steps S12 to S14). Then, the reverse-rotation stop position θr at which the turning of the second roller 32 stops after the motor 45 starts to turn the second roller 32 through the crankshafts 51L and 51R in the reverse direction with the constant torque −Tc whose absolute value is equal to the constant torque Tc is calculated (steps S15 to S17). The center position between these positive-rotation stop position θf and reverse-rotation stop position θr is set as the turning-motion reference point of the second roller (the crankshaft-rotation-angle reference point) (step S18). The traction transmission-capacity control is performed based on a second-roller turning amount (the crankshaft rotation angle θ) given from the turning-motion reference point of the second roller (the crankshaft-rotation-angle reference point). Therefore, the turning-motion reference point of the second roller (the crankshaft-rotation-angle reference point) can be calculated always with accuracy irrespective of the manufacturing variability or errors in dimension and the like of the drive force distribution device, so that the second-roller turning amount (the crankshaft rotation angle θ) can be accurately obtained. Hence, the traction transmission-capacity control can be carried out always to satisfy its targets.

That is, in the traction transmission-capacity control device of the drive force distribution device according to the present invention, the second-roller turning-motion reference point is defined by the center position between the one-direction turning stop position given at a stop time of the turning of the second roller which is caused in one direction by the second-roller turning means and the another-direction turning stop position given at a stop time of the turning of the second roller which is caused in another direction by the second-roller turning means. On the basis of the second-roller turning amount calculated from such a second-roller turning-motion reference point, the traction transmission-capacity control is performed. Accordingly, the second-roller turning-motion reference point (reference point of motion of the traction transmission-capacity control) can be obtained always with accuracy irrespective of the manufacturing variability or errors in dimensions and the like of the drive force distribution device. Therefore, the traction transmission-capacity control can be carried out always to satisfy its targets.

Specifically, in this embodiment, the control-output-torque generation-start crankshaft rotation angle θst which is determined from the motor control-output characteristic map (map C) of FIG. 9 is accurate, i.e., matches the actual state of the device, when the motor-motion characteristic map (map A) and the motor-drive characteristic map (map B) forming a base for the traction transmission-capacity control are learned. That is, based on the control-output-torque generation-start crankshaft rotation angle θst, the learning of the motor-motion characteristic map (map A) and the motor-drive characteristic map (map B) can be accurately performed, so that the traction transmission-capacity control can be carried out always to satisfy its targets.

In this embodiment, each of the above-mentioned constant torque values ±Tc is set at a value which enables the turning of the second roller 32 and which stops this turning of the second roller 32 when the outer circumferential surface of the second roller 32 starts to be in contact with the outer circumferential surface of the first roller 31. That is, each magnitude of the above-mentioned constant torque values ±Tc is set at a minimum value necessary to cause the outer circumferential surface of the second roller 32 to become in contact with the outer circumferential surface of the first roller 31. Therefore, the detections of the positive-rotation stop position θf and the reverse-rotation stop position θr can be promptly completed. Moreover, the absolute values of the constant torque values ±Tc are set to be equal to each other. The above-mentioned advantageous effect of obtaining the second-roller turning-motion reference point (crankshaft rotation-angle reference point) always with accuracy irrespective of the manufacturing variability or errors in dimensions and the like of the drive force distribution device can be further promoted.

Moreover, in this embodiment, the control-output characteristic map (map C) of the motor 45 is obtained that represents the relation between the crankshaft drive torque Tcd (the second-roller turning drive torque) by the motor 45 and the crankshaft rotation angle θ (second-roller turning amount) as exemplified in FIG. 9. Based on this obtained control-output characteristic map (map C), the relation (control motion characteristic, map A) between the crankshaft rotation angle θ (second-roller turning amount) and the inter-roller mutual radially-pressing force Fr is learned. With reference to this learned control-motion characteristic map (map A), the crankshaft rotation-angle command value tθ (target second-roller turning amount) is calculated from a target value of inter-roller mutual radially-pressing force Fr for realizing a target value of traction transmission capacity (the target front-wheel drive force Tf). The motor 45 is operated or driven by the crankshaft rotation-angle command value tθ (target second-roller turning amount) calculated as mentioned above. Hence, the learning of the control-motion characteristic map (map A) reliably prevents the accuracy of the traction transmission-capacity control from being reduced due to an unmatched state between the motion characteristic map (map A) and the actual state of the device that is caused by the manufacturing variability or errors in dimension and the like (such as the variability of the eccentricity amount ε and the variability of the offset amount OS). Therefore, the accuracy of the traction transmission-capacity control can be kept high.

Moreover, in this embodiment, the motor control-input calculating section 80 calculates the target drive force of motor 45 (the second-roller turning means) for realizing the crankshaft rotation-angle command value tθ (target second-roller turning amount), on the basis of the motor-drive characteristic map (map B) representing the relation between the crankshaft rotation angle θ (the second-roller turning amount) and the crankshaft-rotation operating torque Tco necessary to realize this crankshaft rotation angle θ (second-roller turning-amount realizing drive force). When the control input (the motor-current command value I) for generating this target drive force of motor 45 is supplied to the motor 45, the learning of the motor-drive characteristic map (map B) is carried out based on the motor control-output characteristic map (map C) obtained as mentioned above. Hence, the learning of the motor-drive characteristic map (map B) reliably prevents the accuracy of the traction transmission-capacity control from being reduced due to an unmatched state between the motor-drive characteristic map (map B) and the actual state of the device that is caused by the manufacturing variability or errors in dimension and the like (such as the variability of the eccentricity amount ϵ and the variability of the offset amount OS). Therefore, the accuracy of the traction transmission-capacity control can be kept high.

Moreover, in this embodiment, the current values of the eccentricity amount ϵ and the offset amount OS are determined from an information included in the motor control-output characteristic map (map C) obtained as exemplified in FIG. 9, i.e., are determined from the control-output-torque generation-start crankshaft rotation angle θst indicated at the time of generation start of the crankshaft drive torque Tcd (the control output torque of the motor 45 serving as the second-roller turning means), and the variation gradient (control-output-torque variation gradient) δ of the crankshaft drive torque Tcd (the control output torque of the motor 45 serving as the second-roller turning means) relative to the crankshaft rotation angle θ (the control-output motion amount of the motor 45 serving as the second-roller turning means, i.e., the second-roller turning amount). By selecting the characteristic corresponding to these current values of the eccentricity amount ϵ and the offset amount OS, the learning of the control-motion characteristic map (map A) and the learning of the motor-drive characteristic map (map B) are performed. Therefore, such a selection of the characteristic necessary for the learning can be conducted easily and simply in conformity with the current values of eccentricity amount ϵ and offset amount OS.

MODIFIED EMBODIMENT

In the above embodiment, when the motor control-input calculating section 80 calculates the current command value I for the inter-roller pressing-force control motor 45 from the crankshaft rotation-angle command value tθ, the following process is done. That is, the motor control-input calculating section 80 calculates a value of the crankshaft-rotation operating torque Tco (crankshaft rotation-angle realizing drive force) necessary to attain the crankshaft rotation-angle command value tθ, as the target drive torque of the motor 45 by use of the motor-drive characteristic map (map B). Then, the motor control-input calculating section 80 calculates the motor-current command value I of motor 45 which is necessary to attain the crankshaft rotation-angle command value tθ by generating the target drive torque of the motor 45. However, alternatively, the motor-current command value I can be calculated as follows.

That is, a crankshaft rotation-angle difference $\Delta\theta(=t\theta-\theta)$ between the crankshaft rotation-angle command value tθ and the crankshaft rotation angle θ is calculated. Then, a proportional control part (Kp×Δθ) is calculated by multiplying the crankshaft rotation-angle difference Δθ by a proportional control constant Kp, and an integral control part {Ki×(Integral Value of Δθ)} is calculated by multiplying an integral value of the crankshaft rotation-angle difference Δθ by an integral control constant Ki. By a combination (sum) between the proportional control part (Kp×Δθ) and the integral control part {Ki×(Integral Value of Δθ)}, the motor-current command value I of the inter-roller pressing-force control motor 45 which is necessary to bring the crankshaft rotation angle θ equal to its command value tθ is calculated.

In this case, the motor control-input calculating section 80 calculates the current command value I for the motor 45 without using the motor-drive characteristic map (map B). Hence, as a matter of course, the learning of the motor-drive characteristic map (map B) is not necessary.

Moreover, in the above embodiment, as shown in FIG. 2, the second roller 32 is rotatably supported by the eccentric holes 51La and 51Ra of the crankshafts 51L and 51R sup-ported rotatably about the eccentric axis $O_3$. Thereby, the crankshafts 51L and 51R are rotated so that the second roller 32 is turned from a non-transmission position where the second roller 32 is not in contact with the first roller 31 to a transmission position where the second roller 32 is in press-contact with the first roller 31. However, alternatively, a following structure may be employed. That is, the second roller 32 is rotatably supported on an eccentric shaft portion of the crankshaft supported rotatably about the eccentric axis $O_0$ (that is not shown). Thereby, the crankshaft is rotated so that the second roller 32 is turned from a non-transmission position where the second roller 32 is not in contact with the first roller 31 to a transmission position where the second roller 32 is in press-contact with the first roller 31. The above-mentioned ideas according to the present invention are applicable also to a drive force distribution device having such a structure of the second roller 32. Also in this case, similar operations and advantageous effects as the above embodiments are produced as a matter of course.

What is claimed is:
1. A drive force distribution device, comprising:
a first roller;
a second roller; and
a traction transmission capacity control device,
wherein the drive force distribution device distributes drive force between main and auxiliary drive wheels by a traction transmission obtainable by a radially-pressing mutual contact between the first roller and the second roller, the first roller rotates together with a rotating member constituting a torque-transfer path toward the main drive wheel, and the second roller rotates together with a rotating member constituting a torque-transfer path toward the auxiliary drive wheel,
the traction transmission capacity con device being programmed to execute the operations of:
a second-roller turning operation of turning a rotation axis of the second roller around an eccentric axis deviated from the rotation axis of the second roller, and controlling a mutual radially-pressing force between the first roller and the second roller so that a traction transmission capacity is controlled;
a one-direction turning-stop-position detecting operation of detecting a position at which the turning of the rotation axis of the second roller stops after the second-roller turning operation starts to turn the rotation axis of the second roller in one direction;
an another-direction turning-stop-position detecting operation of detecting a position at which the turning of the rotation axis of the second roller stops after the second-roller turning operation starts to turn the rotation axis of the second roller in another direction; and
a second-roller turning-motion reference-point setting operation of setting a center position between the position detected by the one-direction turning-stop-position detecting operation and the position detected by the another-direction turning-stop-position detecting operation, as a turning-motion reference point of the second roller,
wherein the traction transmission capacity control device is programmed to perform a traction transmission capacity control based on a second-roller turning amount given from the turning-motion reference point of the second roller set by the second-roller turning-motion reference-point setting operation.

2. The drive force distribution device according to claim 1, wherein the one-direction turning-stop-position detecting operation detects the position at which the turning of the rotation axis of the second roller stops after the second-roller turning operation starts to turn the rotation axis of the second roller in the one direction with a first constant torque, and the another-direction turning-stop-position detecting operation detects the position at which the turning of the rotation axis of the second roller stops after the second-roller turning operation starts to turn the rotation axis of the second roller in the another direction with a second constant torque equal to the first constant torque.

3. The drive force distribution device according to claim 2, wherein each of the first and second constant torques is a minimum torque value necessary to cause an outer circumferential surface of the second roller to become in contact with an outer circumferential surface of the first roller.

* * * * *